(12) United States Patent
Fiser

(10) Patent No.: US 10,746,421 B2
(45) Date of Patent: Aug. 18, 2020

(54) VENT

(71) Applicant: Lomanco, Inc., Jacksonville, AR (US)

(72) Inventor: Jakob D. Fiser, Little Rock, AR (US)

(73) Assignee: LOMANCO, INC., Jacksonville, AR (US)

( * ) Notice: Subject to any disclaimer, the term of this patent is extended or adjusted under 35 U.S.C. 154(b) by 91 days.

(21) Appl. No.: 15/703,762

(22) Filed: Sep. 13, 2017

(65) Prior Publication Data

US 2018/0066858 A1    Mar. 8, 2018

Related U.S. Application Data

(63) Continuation-in-part of application No. 29/545,500, filed on Nov. 13, 2015, now Pat. No. Des. 804,628.

(51) Int. Cl.
| | | |
|---|---|---|
| *B01D 50/00* | (2006.01) | |
| *F24F 7/02* | (2006.01) | |
| *B01D 46/10* | (2006.01) | |
| *F24F 13/28* | (2006.01) | |
| *B01D 46/00* | (2006.01) | |
| *B01D 45/00* | (2006.01) | |
| *F24F 13/08* | (2006.01) | |

(Continued)

(52) U.S. Cl.
CPC ............... *F24F 7/02* (2013.01); *B01D 45/00* (2013.01); *B01D 46/00* (2013.01); *B01D 46/106* (2013.01); *F24F 13/28* (2013.01); *B01D 50/002* (2013.01); *B01D 2275/30* (2013.01); *B01D 2279/35* (2013.01); *E04D 13/03* (2013.01); *E04D 13/17* (2013.01); *F24F 13/082* (2013.01); *F24F 2221/52* (2013.01)

(58) Field of Classification Search
CPC .......... F24F 7/02; F24F 13/28; F24F 2221/52; F24F 13/082; B01D 46/106; B01D 2275/30; B01D 2279/35; B01D 46/00; B01D 45/00; B01D 50/002; E04D 13/17; E04D 13/03; E04D 13/0325
See application file for complete search history.

(56) References Cited

U.S. PATENT DOCUMENTS 1,921,943 A * 8/1933 Rice ...................... A62C 4/00
                                                        220/372
2,218,348 A   10/1940 Boyer
2,628,551 A    2/1953 Leigh
(Continued)

FOREIGN PATENT DOCUMENTS

CA     560069    7/1958
CA    1329458    5/1994
(Continued)

OTHER PUBLICATIONS

Examination Search Report dated Dec. 3, 2018 for corresponding Canadian Patent Application No. 2,979,248, 4 pages.
(Continued)

*Primary Examiner* — Dung H Bui
(74) *Attorney, Agent, or Firm* — Faegre Drinker Biddle & Reath LLP

(57) ABSTRACT

A vent for allowing airflow between the interior of a building and the exterior of the building while providing a barrier to entry into the building of unwanted exterior environment elements such as pests (e.g., insects and small animals), debris and precipitation is disclosed.

33 Claims, 19 Drawing Sheets

(51) Int. Cl.
  *E04D 13/17* (2006.01)
  *E04D 13/03* (2006.01)

(56) References Cited

U.S. PATENT DOCUMENTS

| | | | |
|---|---|---|---|
| 2,806,419 A | 9/1957 | Artis | |
| 2,826,136 A | 3/1958 | Smith | |
| 2,868,104 A | 1/1959 | Honholt et al. | |
| 2,878,743 A | 3/1959 | Trunnell | |
| 2,909,113 A | 10/1959 | Hatcher | |
| 2,924,165 A | 2/1960 | Doherty | |
| 3,012,375 A | 12/1961 | Wasserman | |
| 3,027,090 A | 3/1962 | Zerhan, Jr. | |
| 3,093,059 A | 6/1963 | Metz | |
| 3,094,915 A | 6/1963 | Leigh | |
| 3,183,822 A | 5/1965 | Stone et al. | |
| 3,238,862 A | 3/1966 | Smith et al. | |
| 3,302,551 A | 2/1967 | Van Belle et al. | |
| 3,469,519 A | 9/1969 | Painter | |
| D216,795 S | 3/1970 | Field et al. | |
| 3,650,198 A | 3/1972 | Stone | |
| 3,934,383 A | 1/1976 | Perry et al. | |
| 4,000,688 A | 1/1977 | Malott | |
| 4,201,121 A | 5/1980 | Brandenburg | |
| 4,297,818 A | 11/1981 | Anderson | |
| 4,307,549 A | 12/1981 | Clanton | |
| 4,339,900 A | 7/1982 | Freeman | |
| D276,543 S | 11/1984 | Hisey | |
| 4,593,504 A | 6/1986 | Bonnici et al. | |
| 4,803,816 A | 2/1989 | Klober | |
| 5,005,328 A | 4/1991 | Holtgreve | |
| D329,694 S | 9/1992 | Wimberly | |
| 5,149,301 A | 9/1992 | Gates | |
| 5,238,450 A * | 8/1993 | Rotter | E04D 13/152 |
| | | | 454/260 |
| 5,383,816 A | 1/1995 | Marcello et al. | |
| 5,394,663 A | 3/1995 | Jackson | |
| 5,402,611 A | 4/1995 | Vagedes | |
| 5,561,952 A | 10/1996 | Damron | |
| 5,591,080 A | 1/1997 | Ward | |
| 5,655,964 A * | 8/1997 | Rheault | F24F 7/02 |
| | | | 454/368 |
| 5,662,522 A | 9/1997 | Waltz | |
| 5,779,539 A | 7/1998 | Kolt | |
| 5,791,985 A | 8/1998 | Schiedegger et al. | |
| 5,947,816 A | 9/1999 | Schiedegger et al. | |
| 6,050,039 A | 4/2000 | O'Hagin | |
| 6,052,956 A | 4/2000 | Hoy et al. | |
| D431,291 S | 9/2000 | McKee | |
| 6,128,870 A | 10/2000 | Kohler | |
| 6,129,628 A | 10/2000 | O'Hagin et al. | |
| 6,155,008 A | 12/2000 | McKee | |
| 6,196,915 B1 | 3/2001 | Schiedegger et al. | |
| 6,263,624 B1 | 7/2001 | Hoy et al. | |
| 6,302,787 B1 | 10/2001 | Graft, Jr. | |
| 6,354,046 B1 | 3/2002 | Swearingen | |
| 6,383,072 B2 | 5/2002 | Schiedegger et al. | |
| 6,386,972 B1 | 5/2002 | Schiedegger et al. | |
| 6,520,852 B2 | 2/2003 | McKee et al. | |
| 6,612,924 B1 | 9/2003 | Mantyla et al. | |
| 6,767,281 B2 | 7/2004 | McKee | |
| 6,805,627 B2 | 10/2004 | Marts et al. | |
| 7,191,564 B2 | 3/2007 | Higginbotham | |
| D556,314 S | 11/2007 | Daniels et al. | |
| 7,544,124 B2 | 6/2009 | Polston | |
| 7,610,726 B2 | 11/2009 | Lajewski | |
| D612,040 S | 3/2010 | Daniels | |
| 7,721,493 B2 | 5/2010 | Skov et al. | |
| 7,774,999 B2 | 8/2010 | McKee | |
| 7,780,510 B2 | 8/2010 | Polston | |
| D625,800 S | 10/2010 | Daniels | |
| D629,093 S | 12/2010 | Polston | |
| 7,882,670 B2 | 2/2011 | West | |
| 7,930,858 B2 | 4/2011 | Lajewski | |
| 8,181,403 B1 | 5/2012 | Polston | |
| 8,205,401 B2 | 6/2012 | Ward | |
| 8,240,093 B2 | 8/2012 | Lajewski | |
| D667,945 S | 9/2012 | Irmer et al. | |
| 8,650,833 B1 | 2/2014 | Polston | |
| D703,305 S | 4/2014 | Stollenwerk O'Hagin | |
| D704,815 S | 5/2014 | Butler et al. | |
| D704,816 S | 5/2014 | Butler et al. | |
| 8,845,405 B2 | 9/2014 | Greenberg | |
| 9,151,295 B2 | 10/2015 | Avedon | |
| 9,243,813 B2 | 1/2016 | Mantyla et al. | |
| 2003/0050006 A1 | 3/2003 | Myint | |
| 2005/0055920 A1 * | 3/2005 | Lajewski | F24F 13/084 |
| | | | 52/302.1 |
| 2005/0130581 A1 | 6/2005 | Dodge | |
| 2006/0037259 A1 | 2/2006 | West | |
| 2007/0044401 A1 | 3/2007 | Bonshor | |
| 2007/0141975 A1 * | 6/2007 | Polston | F24F 7/02 |
| | | | 454/365 |
| 2007/0167130 A1 | 7/2007 | Brochu | |
| 2007/0173191 A1 | 7/2007 | Daniels et al. | |
| 2007/0199948 A1 * | 8/2007 | Ericson | B01D 50/002 |
| | | | 220/747 |
| 2007/0220819 A1 | 9/2007 | Neuschafer et al. | |
| 2008/0053049 A1 * | 3/2008 | Pfannenberg | B01D 46/0005 |
| | | | 55/493 |
| 2009/0023377 A1 | 1/2009 | Duke et al. | |
| 2009/0053990 A1 | 2/2009 | McKee | |
| 2010/0000166 A1 * | 1/2010 | Lajewski | F24F 7/00 |
| | | | 52/219 |
| 2010/0162643 A1 | 7/2010 | Blomberg et al. | |
| 2010/0184366 A1 | 7/2010 | Hassenstab | |
| 2010/0311319 A1 | 12/2010 | McKee et al. | |
| 2011/0294412 A1 | 12/2011 | Vagedes | |
| 2012/0073239 A1 | 3/2012 | Haines | |
| 2012/0304567 A1 | 12/2012 | Baker et al. | |
| 2013/0115871 A1 | 5/2013 | Bourque et al. | |
| 2014/0065944 A1 | 3/2014 | Chamness | |
| 2014/0342658 A1 | 11/2014 | Parkinson et al. | |
| 2015/0167992 A1 | 6/2015 | Bourque | |
| 2016/0097560 A1 | 4/2016 | Mantyla et al. | |
| 2016/0102885 A1 * | 4/2016 | Karkheck | H02S 20/23 |
| | | | 454/367 |

FOREIGN PATENT DOCUMENTS

| | | |
|---|---|---|
| CA | 2267823 | 12/2001 |
| CA | 2309941 | 7/2009 |
| CA | 2364672 | 6/2010 |
| CA | 2371455 | 10/2010 |
| CA | 2764725 | 5/2011 |
| CA | 2671855 | 4/2012 |
| CA | 2536023 | 2/2013 |
| CA | 2792461 | 4/2014 |
| CA | 2803775 | 9/2014 |
| CA | 2597366 | 3/2015 |
| CA | 2870331 | 5/2015 |
| CA | 2851109 | 11/2015 |
| CA | 2753482 | 3/2018 |
| CA | 2766888 | 5/2018 |
| WO | WO2000/034132 | 6/2000 |
| WO | WO2013114205 | 8/2013 |
| WO | WO2015168778 | 11/2015 |

OTHER PUBLICATIONS

CSA Standard CAN3-A93-M82, Natural Airflow Ventilators for Buildings, 24 pages, dated Dec. 1982.
Leigh Ventilators, Leigh Products, Inc., 1963, 3 pages.
Leigh Roof and Undereaves Ventilators, Leigh Products, Inc., Nov. 23, 1970, 1 page.
Leigh 144 Roof Ventilator Bulletin, Air Control Products, Inc., Feb. 21, 1962, 5 pages.
New Leigh Roof Vent Offers Big Savings in Ventilator and Installation Costs, Leigh Newsletter, Feb. 1962, one page.
Leigh 144 Roof Ventilator Bulletin, Air Control Products, Inc., Dec. 13, 1961, 5 pages.
Plastic Static Vents Brochure, Air Vent Inc., 2015, 2 pages.

(56) References Cited

OTHER PUBLICATIONS

Slant-Back Plastic Roof Louver—IR65, GAF, accessed Dec. 13, 2018, available at https://www.gaf.com/en-us/roofing-products/residential-roofing-products/ventilation-and-attic-vents/exhaust/roof-louvers/master-flow-ir65#DOCUMENTS, 2 pages.

Lomanco 800 Series Installation Instructions, accessed Dec. 13, 2018, available at https://www.kamcoboston.com/Store/redirector.asp?documentID=121&whereFrom=Product_View, 1 Page.

* cited by examiner

VENT

CROSS REFERENCE TO RELATED APPLICATIONS

The present application claims the benefit under Title 35, U.S.C. Section 120 of U.S. Design patent application No. 29/545,500, filed Nov. 13, 2015 and entitled ROOF VENT, the entire disclosure of which is hereby expressly incorporated herein by reference. The present application is related to co-pending design patent application No. 29/617,390 and 29/617,395, entitled VENT and PORTION OF A VENT, respectively, both of which are filed on even date herewith and the entire disclosures of both which are hereby expressly incorporated herein by reference.

BACKGROUND/SUMMARY

The present disclosure relates to a vent. More particularly, the present disclosure relates to a vent for allowing airflow between the interior of a building and the exterior of the building while providing a barrier to entry into the building of unwanted exterior environment elements, such as pests (e.g., insects and small animals), debris and precipitation.

Venting can be used to provide a continuous supply of outdoor air to the attic space of a home or other building. Vents can be used to provide air intake into the attic space and air exhaust from the attic space to provide for the desired continuous supply of outdoor air to the attic.

Building ventilation fights the deleterious effects of high heat and moisture. Heat in unventilated attics may cause extremely high attic temperatures, which can cause damage to shingles, roof sheathing, and also radiate down into the living area, causing excessive air conditioning usage to maintain comfort. Moisture can cause rot, mildew, mold, paint blister and decrease the effectiveness of insulation.

Static roof vents can be utilized to provide desired airflow between a building and the surrounding environment. Static roof vents are installed over openings in a roof and allow rising hot air and moisture to escape the attic space. Static roof vents are passive vents that do not include moving parts to facilitate airflow, but rather simply define an airflow conduit through which the underlying structure can vent.

The present disclosure provides a passive vent having an advantageous construction balancing the competing desires of providing sufficient airflow while preventing intrusion of unwanted debris, precipitation and live pests.

The disclosure, in one form thereof, provides a vent including a base comprising a vent wall defining a passageway for fluid communication with a structure to be vented, a cover positioned over the passageway to cover a lateral extent of the passageway, the cover including a cover skirt, and an inner guard, the inner guard defining a grate, the inner guard including a connector for selectively connecting the inner guard to the base, the grate extending laterally outwardly from the vent wall when the inner guard is connected to the base, the inner guard sized to substantially span the vent wall and the cover skirt.

In certain alternative exemplifications, the base further comprises a flange, with the flange extending outwardly from the vent wall and comprising an anchor for securing the vents to a building, the inner guard spaced upwardly from the flange to create an open space for an airflow between the flange and the inner guard.

In certain alternative exemplifications, the inner guard comprises a rigid inner guard having an outer perimeter juxtaposed with the cover skirt to support the cover and prevent substantial inward bowing of the cover skirt.

In certain alternative exemplifications, the inner guard comprises a precipitation baffle, the precipitation baffle positioned between the vent wall and the cover skirt, the precipitation baffle having a height defined between a top and a bottom, the top and the bottom of the precipitation baffles spaced from the base and the cover to define a floating precipitation baffle.

In certain alternative exemplifications, the grate comprises a plurality of intersecting numbers defining a plurality of openings, and wherein the precipitation baffle comprises a tallest one of the intersecting members. In additional alternative exemplifications, the grate of the inner guard is defined by a plurality of intersecting members intersecting the precipitation baffle, a first plurality of the intersecting numbers having a first height, a second plurality of the intersecting numbers having a second height, the first height less than the second height, the second plurality of the intersecting members spaced along the precipitation baffle, a plurality of the first plurality of the intersecting members positioned between adjacent ones of the second plurality of the intersecting members.

In certain alternative exemplifications, the cover is selectively securable to the base, with the inner guard captured between the cover and the base. In further alternative exemplifications, a layer of filter media overlies the inner guard, the layer of filter media captured between the cover and the inner guard, the cover including a plurality of filter media extensions extending from an under surface of the cover to abut the layer of filter media positioned over the inner guard.

In alternative exemplifications of the present disclosure, a layer of filter media overlies the inner guard, the grate having a grate pore size defined by a majority of a plurality of pores through the inner guard, the filter media having a filter media pore size defined by a majority of a plurality of pores through the filter media, the filter media pore size smaller than the grate pore size, whereby moisture encountering the filter media will not pass the filter media and will drip, via gravity, away from the passageway. In further alternative exemplifications, the layer of filter media comprises a mesh screen. In additional alternative exemplifications, a ratio of the grate pore size to the filter media pore size is at least 2 to 1, whereby each pore through the grate is at least twice as big as each pore through the filter media.

In alternative exemplifications of the present disclosure, the grate does not overlie the passageway so that the grate of the inner guard filters an airflow flowing through the vent without laterally covering the passageway defined by the vent wall.

The disclosure, in another form thereof, provides a vent including a base comprising a vent wall defining a passageway for fluid communication with a structure to be vented, a cover positioned over the passageway to cover a lateral extent of the passageway, an inner guard, the inner guard defining a grate having a grate pore size, the inner guard positioned to filter an airflow flowing through the vent, and a layer of filter media overlying the inner guard, the filter media overlying the inner guard, the filter media having a filter media pore size, the filter media pore size smaller than the grate pore size.

In alternative exemplifications, the cover includes a cover skirt, and the inner guard substantially spans the vent wall and the cover skirt, with the grate extending laterally outwardly from the vent wall.

In additional alternative exemplifications, the cover is selectively securable to the vent wall to laterally cover the passageway.

In alternative exemplifications, the inner guard includes a connector for selectively connecting the inner guard to the vent wall to substantially span the vent wall and the cover skirt.

In alternative exemplifications, the base further comprises a flange, the flange extending outwardly from the vent wall and comprising an anchor for securing the vent to a building, the inner guard spaced upwardly from the flange to create and open space for the airflow between the flange and the inner guard.

In alternative exemplifications, the inner guard comprises a rigid inner guard having an outer perimeter juxtaposed with the cover skirt to support the cover and prevent substantial inward bowing of the cover skirt.

In alternative exemplifications, the inner guard comprises a precipitation baffle, the precipitation baffle positioned between the vent wall and the cover skirt, the precipitation baffle having a height defined between a top and a bottom the top and the bottom of precipitation baffle spaced from the base and the cover to define a floating precipitation baffle. In further alternative exemplifications, the grate of the inner guard comprises a plurality of intersecting members defining a plurality of openings, and wherein the precipitation baffle comprises a tallest one of the intersecting members. In additional alternative exemplifications, the grate is defined by a plurality of intersecting members intersecting the precipitation baffle, a first plurality of the intersecting members having a first height, a second plurality of the intersecting members having a second height, the first height less than the second height, the second plurality of the intersecting members spaced along the precipitation baffle, a plurality of the first plurality of the intersecting members positioned adjacent ones of the second plurality of the intersecting members.

In alternative exemplifications, the cover is selectively securable to the base, with the inner guard and the layer of filter media captured between the cover and the base, the cover including a plurality of filter media extensions extending from an under surface of the cover to abut the layer of filter media positioned over the inner guard.

In alternative exemplifications, the filter media comprises a mesh screen.

In alternative exemplifications, a ration of the grate pore size to the filter media pore size is at least two to one, whereby each pore through the grate is at least twice as big as each pore through the filter media.

In alternative exemplifications, the grate does not overlay the passageway.

The disclosure, an yet another form thereof, provides a vent including a vent wall defining a passageway for fluid communication with a structure to be vented, a cover positioned over the passageway to cover a lateral extent of the passageway, the cover including a cover skirt, the cover skirt positioned a laterally outward distance from the vent wall, and a layer of filter media having a pore size of about two millimeters squared spanning the vent wall and the cover skirt.

In alternative exemplifications, the vent further includes an inner guard defining a grate, the grate spanning the vent wall and the cover skirt, the layer of filter media overlying the grate.

In alternative exemplifications, the vent further includes a flange extending outwardly from the vent wall and comprising an anchor for securing the vent to a building, the inner guard spaced upwardly from the flange to create an open space for an airflow between the flange and the inner guard.

In alternative exemplifications, the inner guard comprises a rigid inner guard having an outer perimeter juxtaposed with the cover skirt to support the cover and prevent substantial inward bowing of the cover skirt.

In alternative exemplifications, the inner guard comprises a precipitation baffle, the precipitation baffle positioned between the vent wall and the cover skirt, the precipitation baffle having a height defined between a top and a bottom the top and the bottom of the precipitation baffle spaced from the flange and the cover to define a floating precipitation baffle. In alternative exemplifications, the grate of the inner guard comprises a plurality of intersecting members defining a plurality of openings, with the precipitation baffle comprises a tallest one of the intersecting members. In further alternative exemplifications, the grate of the inner guard is defined by a plurality of intersecting members intersecting the precipitation baffle, a first plurality of the intersecting members having a first height, a second plurality of the intersecting members having a second height, the first height less than the second height, the second plurality of intersecting members spaced along the precipitation baffle, a plurality of the first plurality of the intersecting members positioned between adjacent ones of the second plurality of the intersecting members.

In alternative exemplifications, the cover is selectively securable to the vent wall, with the inner guard captured between the cover and the base, and the layer of filter media captured between the cover and the inner guard, the cover including a plurality of filter media extensions extending from an under surface of the cover to abut the layer of filter media positioned over the inner guard.

In alternative exemplifications, the grate of the inner guard has a grate pore size defined by a majority of a plurality of pores through the inner guard, the filter media having a filter media pore size defined by a majority of a plurality of pores through the filter media, the filter media pore size smaller than the grate pore size, whereby moisture encountering the filter media will not pass the filter media and it will drip, via gravity away from the passageway. In further alternative exemplifications, the filter media comprises a mesh screen. In additional alternative exemplifications, a ratio of the grate pore size to the filter media pore size is at least 2-1, whereby each pore through the grate is at least twice as big as each pore through the filter media.

In alternative exemplifications, the grate does not overlay the passageway.

BRIEF DESCRIPTION OF THE DRAWINGS

The above-mentioned and other features of the disclosure, and the manner of attaining them, will become more apparent and will be better understood by reference to the following description of embodiments of the disclosure taken in conjunction with the accompanying drawings, wherein.

Figure 1:
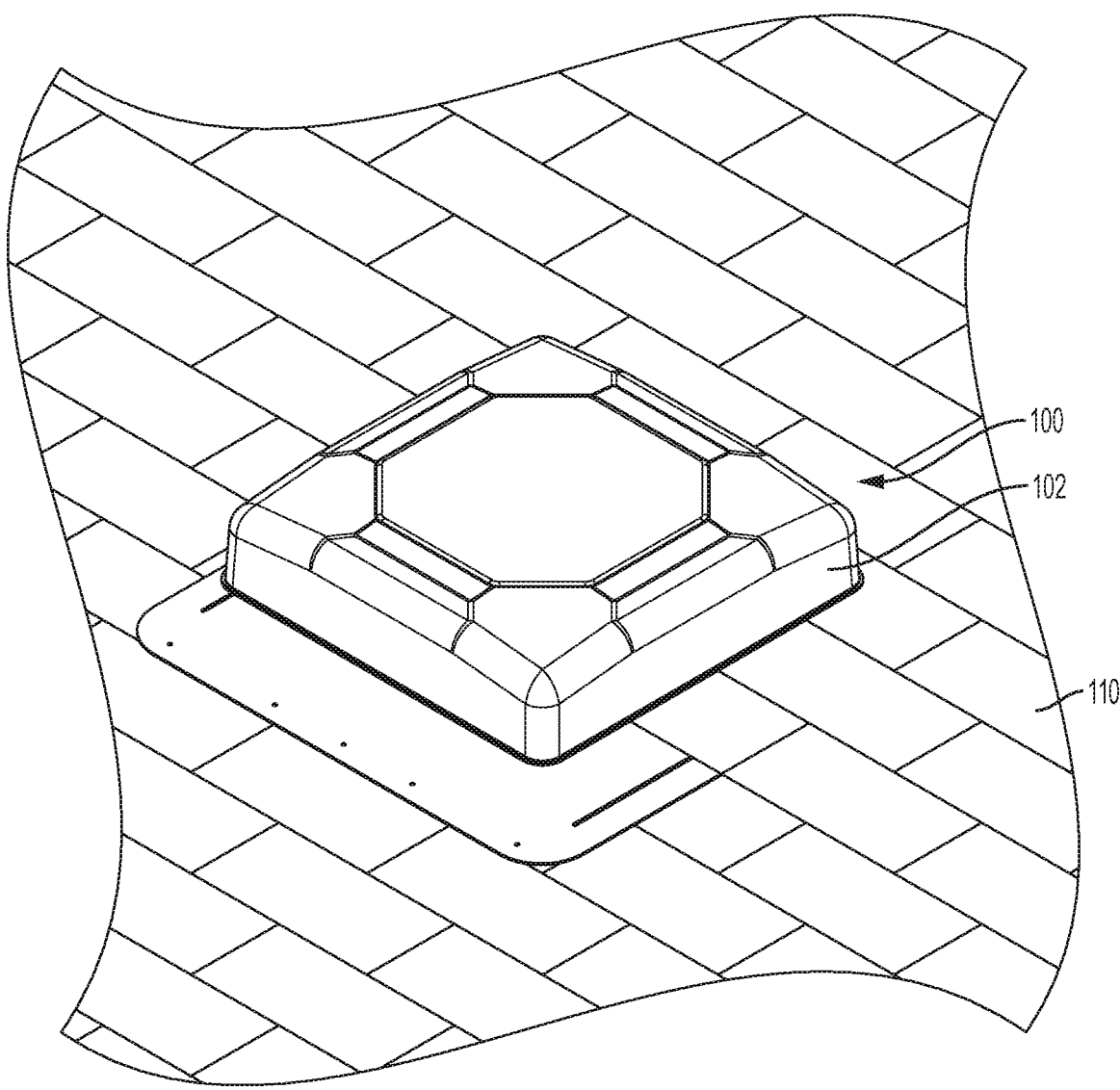
FIG. 1 is a perspective view of a first embodiment vent of the present disclosure anchored to a roof.

Corresponding reference characters indicate corresponding parts throughout the several views. Although the drawings represent embodiments of the present invention, the drawings are not necessarily to scale and certain features may be exaggerated in order to better illustrate and explain the invention. The exemplifications set out herein illustrate embodiments of the invention and such exemplifications are not to be construed as limiting the scope of the invention in any manner.

DETAILED DESCRIPTION

Figure 1A:
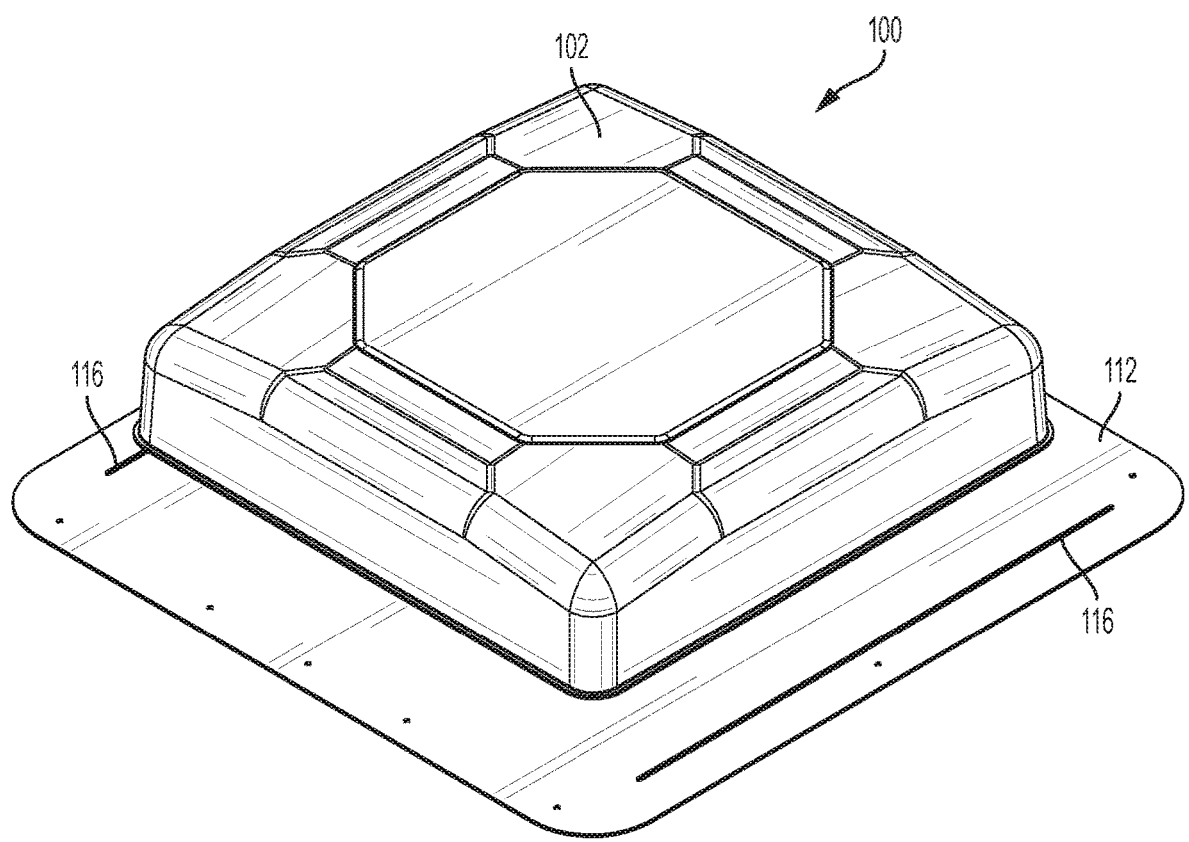
FIG. 1A is a perspective view of the vent of FIG. 1 standing alone, i.e., not anchored to a roof.

FIGS. 1-8 illustrate an exemplary vent 100 of the present disclosure. In this exemplification, vent 100 comprises a static roof vent. Vent 100 is shown standing alone in FIG. 1A and secured to roof 110 in FIG. 1. As will be described in further detail below, vent 100 covers an aperture through roof 110 allowing airflow between the structure beneath roof 110 and the ambient air exterior of the structure covered by roof 110. The roof to which vents of the present disclosure can be attached can be pitched, e.g., at angles of 9°, 15°, 18°, 30°, or 55°. Vent 100 is further depicted in the illustrations of co-pending design patent application No. 29/617,390 entitled VENT, previously incorporated by reference in this document.

Figure 2:
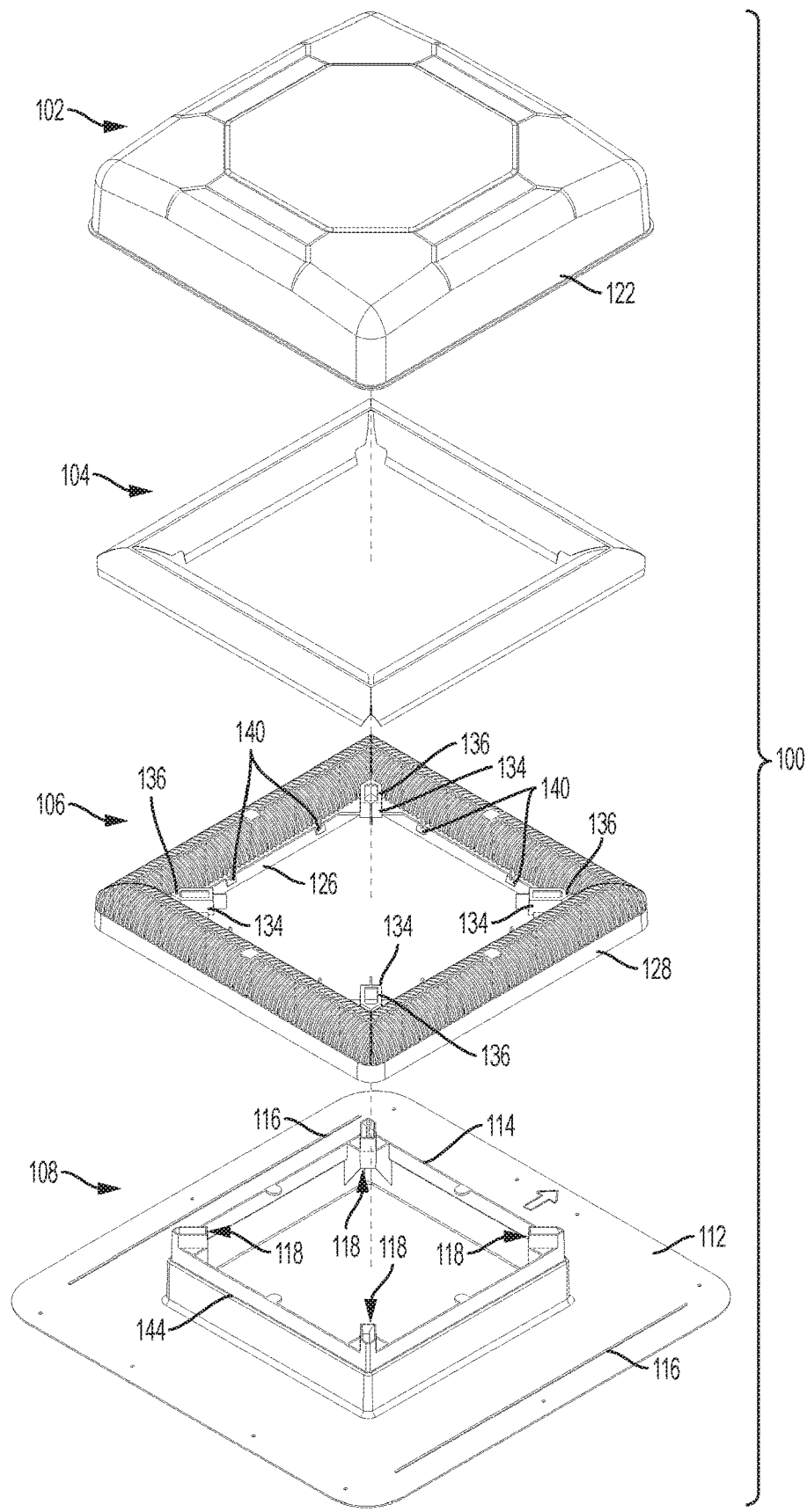
FIG. 2 is a top exploded, perspective view of the vent of FIG. 1.
Figure 2A:
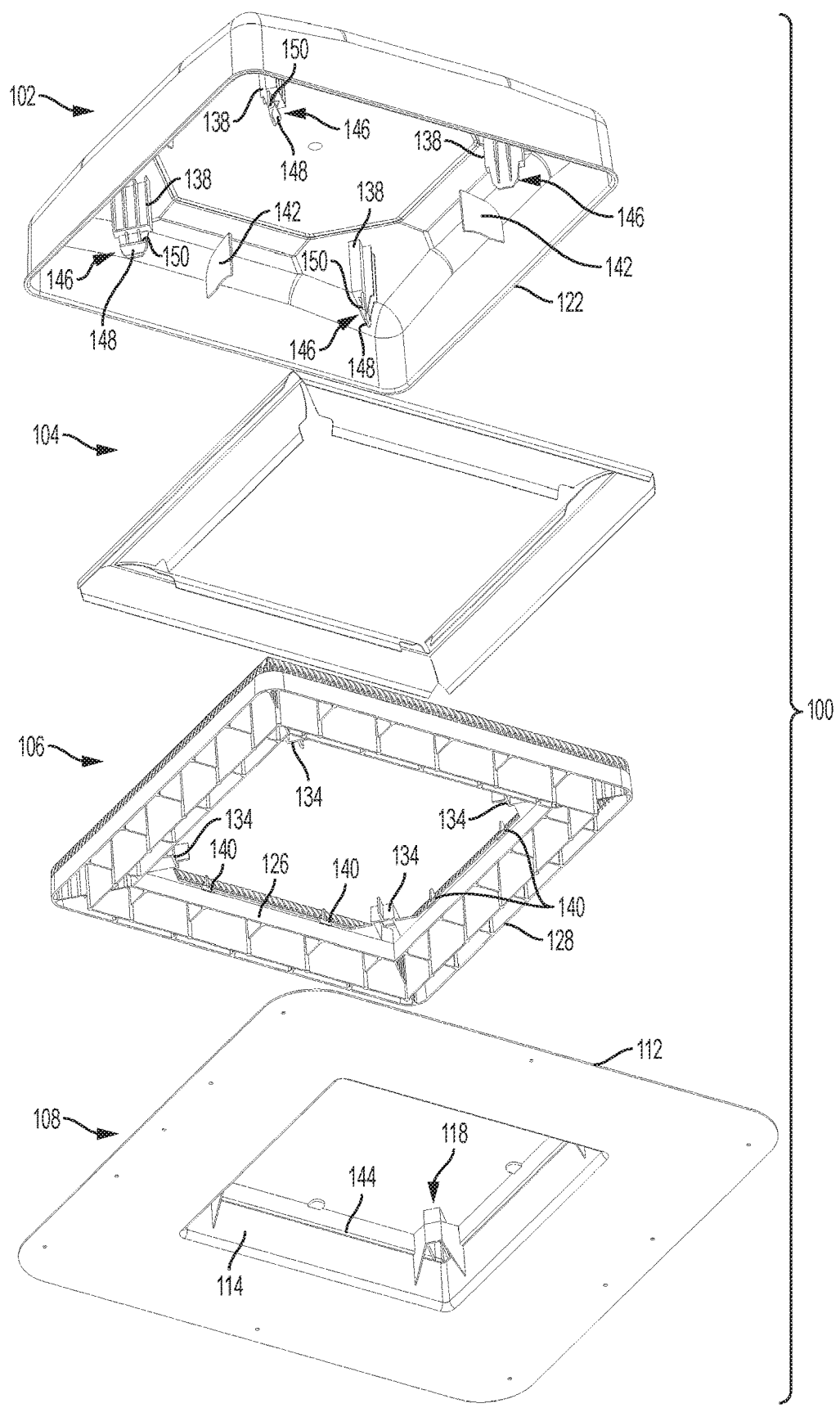
FIG. 2A is a bottom exploded, perspective view of the vent of FIG. 1.

Referring to FIGS. 1A, 2, 2A and 3, vent 100 includes base 108 including flange 112 and vent wall 114. Vent wall 114 is an upstanding wall extending generally orthogonally from flange 112. In use, flange 112 is placed against a partially shingled roof surface and secured thereto with fasteners, such as nails, traversing perimeter apertures (as shown but not numbered in FIGS. 1A, 2 and 3) to secure base 108 to the roof. Specifically, base 108 is secured to roof 110 such that the lower portion of flange 112 rests atop roof shingles (FIG. 1) and vent wall 114 is positioned atop a correspondingly sized and shaped aperture through roof 110 so that vent wall 114 defines a passageway for fluid communication with the structure underlying roof 110. In a typical installation, the roof is shingled from the lowest point up to the vent aperture and thereafter vent 100 is placed atop the roof, with flange 112 having a lower portion below vent wall 114 placed atop the shingles. With base 108 secured to the roof, further shingles may be positioned over flange 112 and placed in abutment with an exterior of vent wall 114 to form the finished construct shown in FIG. 1. As shown in FIG. 2, base 108 includes an arrow which, on installation, will point toward the apex of roof 110. Rain ridges 116 are provided, as is conventional in the art. Base 108 further includes four receivers 118, one each positioned at a corner of vent wall 114. Receivers 118 will be utilized to secure the remaining components of vent 100 to create a finished construct.

Figure 3:
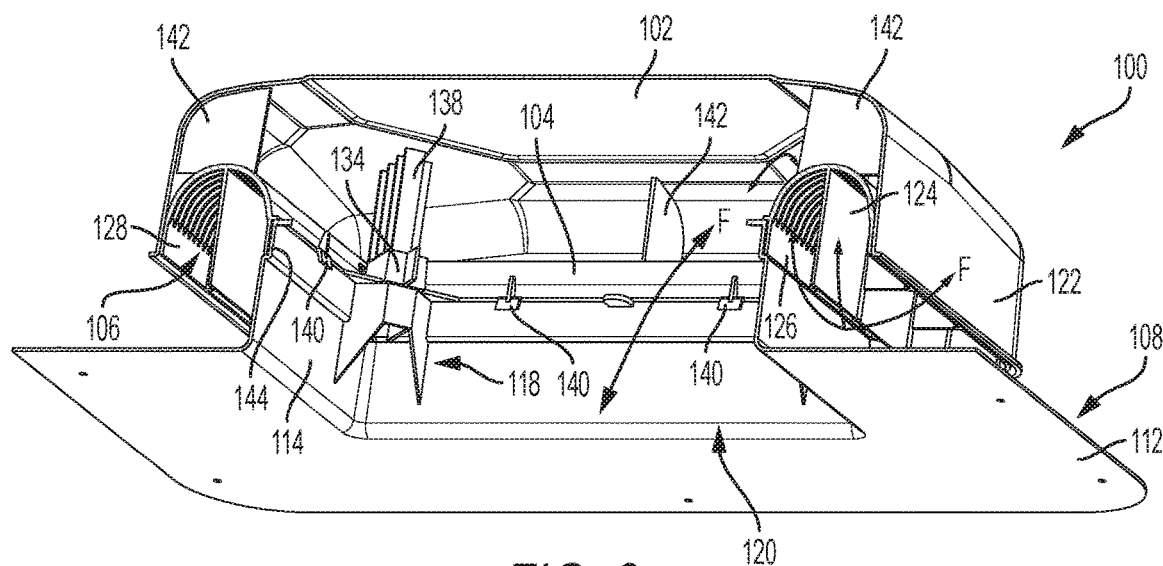
FIG. 3 is a sectional, perspective view of the vent of FIG. 1.
Figure 4:
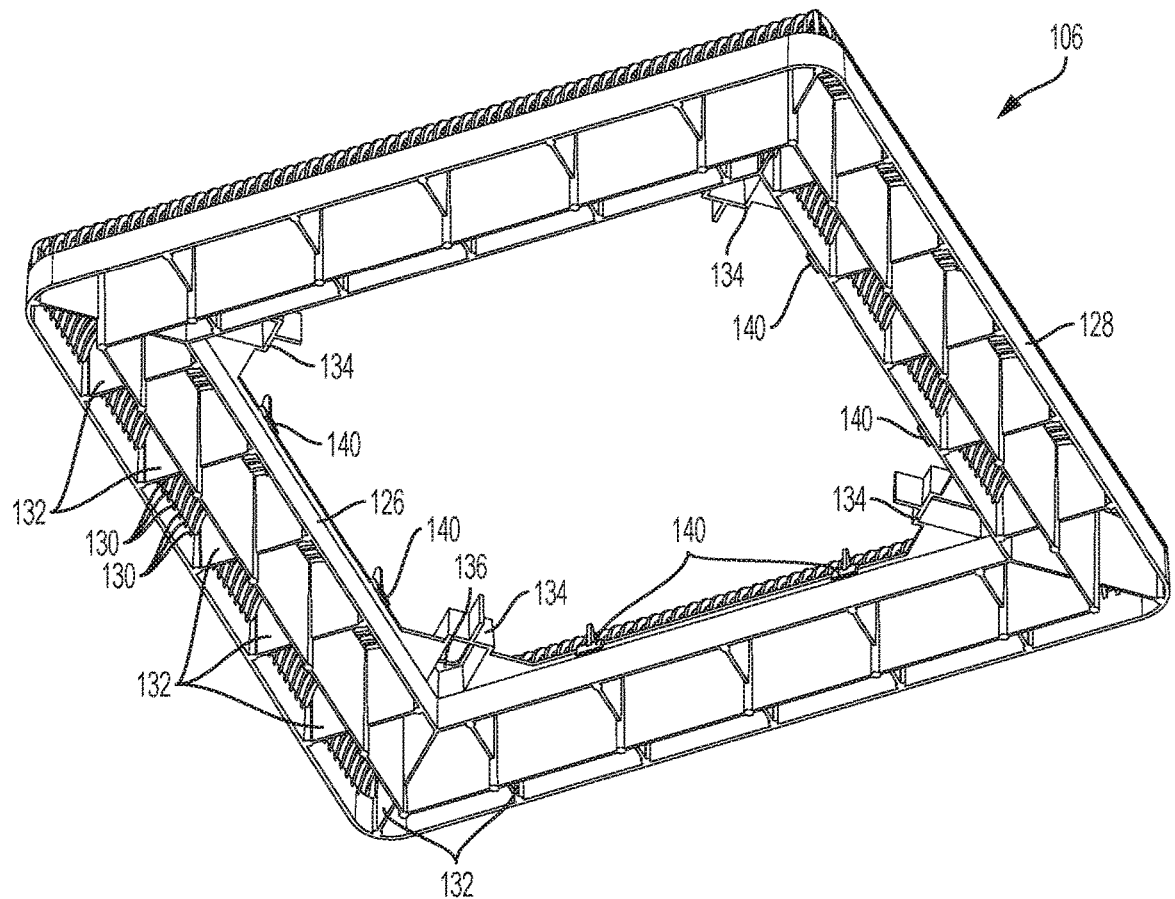
FIG. 4 is a bottom perspective view of an inner guard utilized in the vent of FIGS. 1-3.
Figure 5:
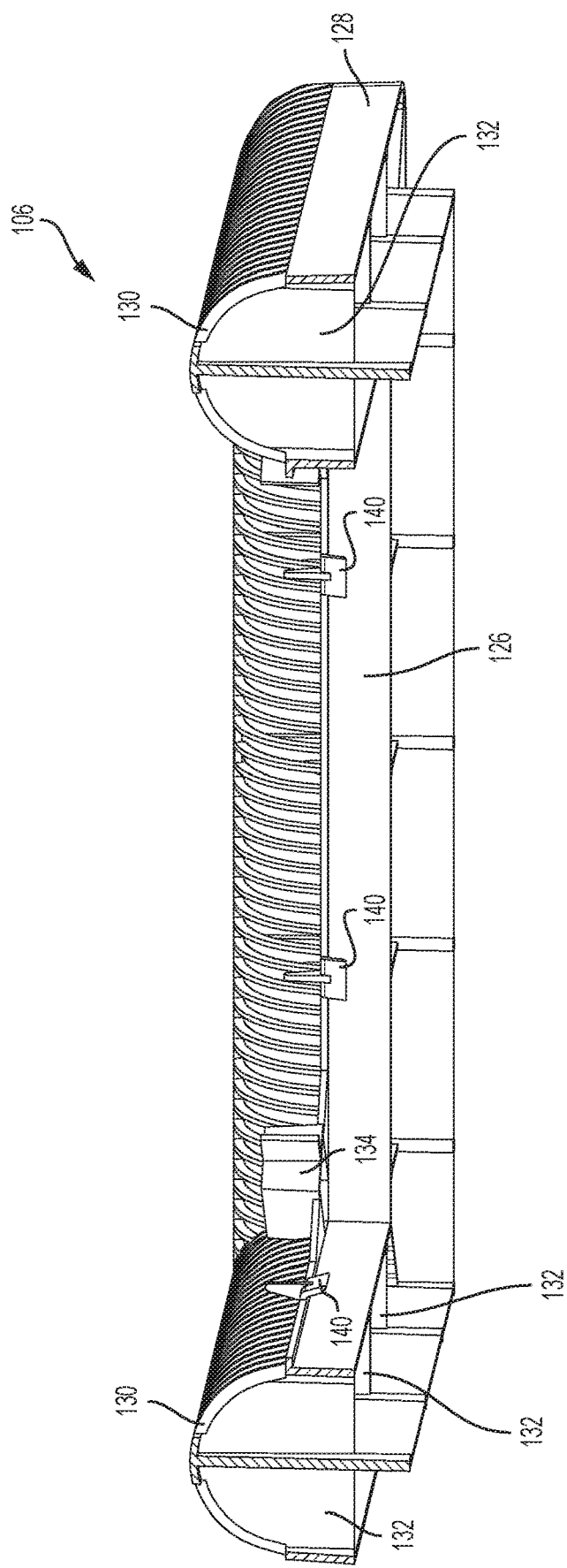
FIG. 5 is a sectional view of the inner guard of FIG. 4.
Figure 6:
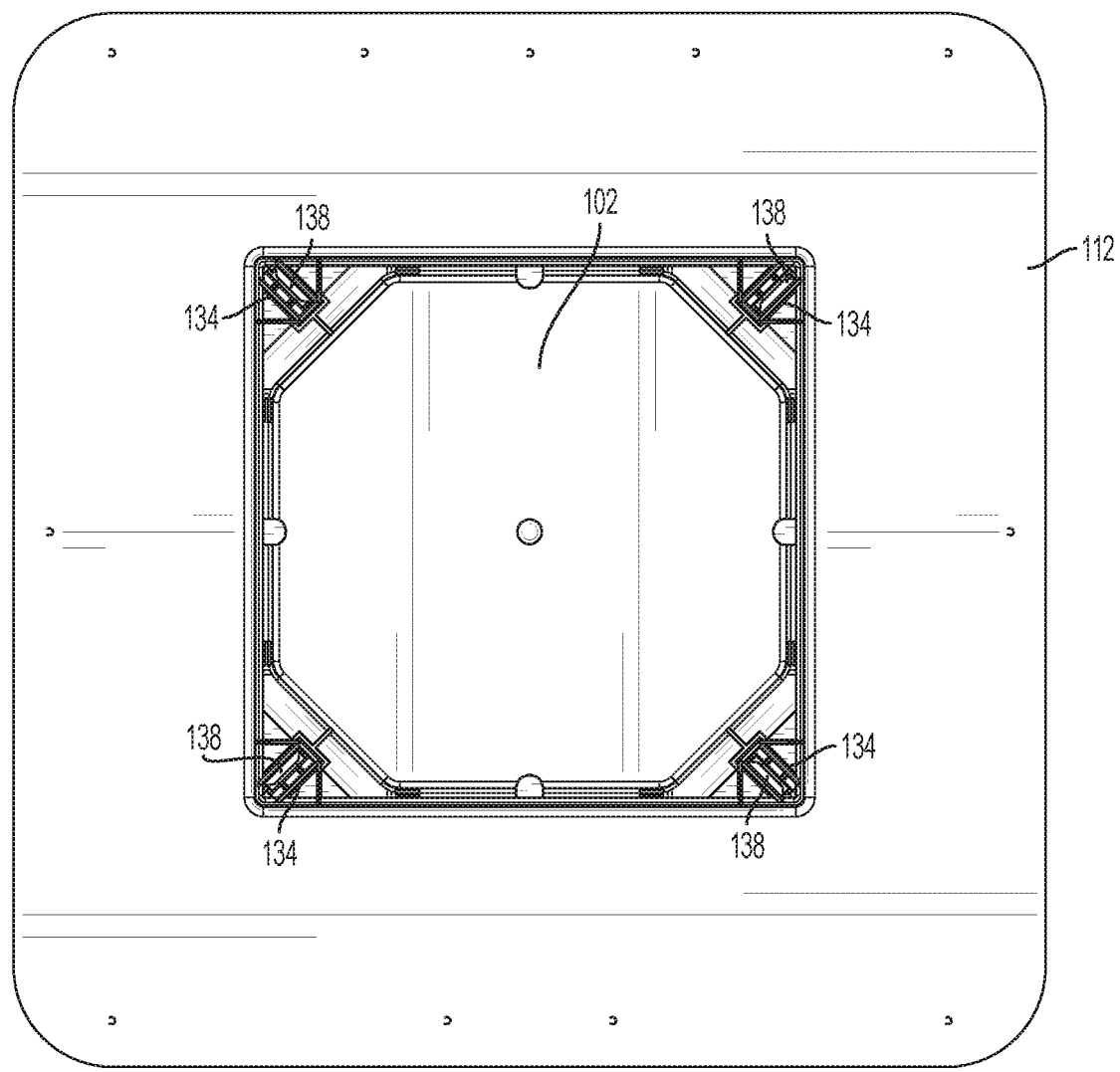
FIG. 6 is a bottom elevational view of the vent of FIGS. 1-3.

To form finished vent 100, inner guard 106 is positioned atop base 108. Specifically, receivers 118 extending upwardly from base 108 are positioned into collars 134 extending inwardly from inner skirt 126 of inner guard 106. With collars 134 positioned over receivers 118, inner guard 106 is supported by base 108, with a flange 136 (FIG. 4) extending inwardly from the vertical wall forming each collar 134 resting atop a receiver 118. Alternatively, the bottom surface of collars 134 may rest atop the gussets connecting receivers 118 to vent wall 114. Furthermore, support tabs 140 may engage the top of vent wall 114 to support inner guard 106 atop base 108. Additionally, vent wall 114, in the exemplification shown in FIG. 3, features ledge 144 against which the bottom of inner guard 106 may rest, as illustrated in FIG. 3. Any of the support structures for supporting inner guard 106 above base 108 may be used in combination, including a combination featuring all of the supports working together.

With inner guard 106 positioned atop base 108, filter media 104 is positioned atop inner guard 106 such that filter media 104 covers the pores through inner guard 106. With filter media 104 covering inner guard 106, cover 102 is secured to base 108 to complete vent 100. Specifically, securement posts 138 (FIGS. 2A, 3)) are received in and secured to receivers 118. Each securement post 138 (one of which is positioned at each corner of cover 102) includes flexible terminal end 146 featuring ramp 148 leading up to shoulder 150 such that the shoulder 150 of each securement post 138 is flexed away from its normally biased positioned as cover 102 is engaged with base 108 and the ramp 148 of each securement post 138 rides along a complementary shoulder in each receiver 118. Each receiver 118 defines a hollow passageway into which the aforementioned complementary shoulder protrudes. When ramps 148 of each securement post 138 pass the complementary shoulders in each receiver 118, each securement post 138 returns to its normally biased position, with the shoulder 150 of each securement post 138 engaged with the complementary shoulder of each receiver 118 to prevent lifting of cover 102 from base 108. Should removal of cover 102 be desired, the distal ends of securement posts 138 can be accessed through the bottom of receivers 118 (which are hollow along their entire lengths) to move each of the shoulders of securement posts 138 out of engagement with the complementary shoulders in receivers 118. With cover 102 secured to base 108, a ledge spaced from the shoulder of each securement post 138 blocks upward movement of each collar 134 of inner guard 106.

Cover 102 features four filter media hold down gussets 142 (three of which are shown in FIG. 3), one each located at approximately the middle of each of the four sides of cover 102, that extend from the undersurface of cover 102. When cover 102 is secured to base 108, each filter media hold down gusset contacts filter media 104 to hold filter media 104 against inner guard 106. With cover 102 secured to base 108, cover 102 covers a lateral extent of the passageway defined by vent wall 114, i.e., cover 102 is positioned vertically over vent wall 114 and extends over the opening defined by vent wall 114 to prevent entry through vent wall 114. Cover 102 extends further laterally outside the envelope of vent wall 114 and includes cover skirt 122 extending downward below the upper extent of vent wall 114, as shown, e.g., in FIG. 3.

Referring to FIG. 3, when assembled for use, vent 100 features mouth 120 defined by the intersection of vent wall 114 and flange 112. In use, mouth 120 will be positioned atop and adjacent to a similarly sized and shaped aperture formed through roof 110 (FIG. 1) of the building to be vented. In this position, hot air from the underlying structure can rise out of the building and through vent 100 to the atmosphere outside. Initially, hot air can rise through mouth 120 of vent 100. At this point, such hot air can flow along flow path F depicted in FIG. 3 over vent wall 114, through filter media 104 and inner guard 106 (the construction of which will be further described hereinbelow), past cover skirt 122 and, finally, to the exterior atmosphere. Exemplary flow paths F are illustrated in FIG. 3, it being understood that similar flow about the entire length of vent wall 114 is capable of occurring. Flow path F is illustrated with double ended arrows, showing that airflow can pass from interior to exterior, and exterior to interior, depending on the conditions; however, vent 100 is exemplified in FIGS. 1-5 as a static roof vent, which will typically be utilized to provide an airflow path out of the underlying building to the exterior.

While advantageously allowing airflow between the underlying building and the atmosphere exterior of the underlying building, vent 100 also prevents intrusion of unwanted debris and living creatures, such as birds and animals, as well as precipitation. Referring to FIGS. 2-5, inner guard 106 includes a plurality of intersecting members defining a grate. Precipitation baffle 124 is the tallest of the intersecting members and is centrally positioned intermediate vent wall 114 and cover skirt 122. Precipitation baffle 124 provides a barrier to entry of precipitation into the passageway defined by vent wall 114. Specifically, precipitation baffle 124 is positioned so that a substantial portion of rain or other precipitation bouncing off roof 110 (FIG. 1) or otherwise entering under cover 102 encounters precipitation baffle 124 and forms droplets thereon, which droplets drain from vent 100 via gravity. Precipitation baffle 124 comprises a "floating" precipitation baffle as it is free from direct connection at its top or bottom, i.e. the top and bottom of precipitation baffle 124 define free ends. While the top of precipitation baffle 124 does not extend upwardly from the precipitation baffle itself, it does not abut any other structure of vent 100 and is, therefore, still considered to be a free end. Inner guard 106 is further depicted in the illustrations of co-pending design patent application No. 29/617,395 entitled PORTION OF A VENT, previously incorporated by reference in this document.

The grate of inner guard 106 is further defined by inner skirt 126 and outer skirt 128. Inner skirt 126, outer skirt 128 and precipitation baffle 124 all generally follow the pattern defined by vent wall 114, while being progressively larger in lateral size. In the exemplification of FIGS. 1-5, vent wall 114, inner skirt 126, precipitation baffle 124 and outer skirt 128 are all generally square, with outer skirt 128 having rounded corners. Inner skirt 126, precipitation baffle 124 and outer skirt 128 are spanned by transverse members 130 and transverse members 132. More specifically, transverse members 130 and transverse members 132 extend from inner skirt 126 to precipitation baffle 124 and from precipitation baffle to outer skirt 128. Transverse members 130, transverse members 132, inner skirt 126, precipitation baffle 124 and outer skirt 128 cooperate to define intersecting members which form a grate of inner guard 106.

Transverse members 132 are taller than transverse members 130. Transverse members 132 provide functionality similar to the functionality of precipitation baffle 124 described above with respect to precipitation. Specifically, transverse members 132 are positioned so that rain or other precipitation bouncing off roof 110 (FIG. 1) or otherwise entering under cover 102 will, if not encountering precipitation baffle 124, likely encounter one of the plurality of transverse members 132. Precipitation encountering one of transverse members 132 will form droplets which will drain from vent 100 via gravity. Transverse members 130 are shorter than transverse members 132 and; therefore, do not provide the same functionality with respect to preventing ingress of precipitation. Transverse members 132 are fewer in number than transverse members 130, with a plurality of transverse members 130 positioned between each adjacent pair of transverse members 132. The spacing of transverse members 132 is sufficient to adequately block large amounts of precipitation from entering the underlying building through vent 100, but is not sufficient to desirably block debris and pests. Therefore, additional transverse members in the form of transverse members 130 are added to the design. Because transverse members 130 are not principally designed to block precipitation, they are much shorter than transverse members 132. Decreasing the height of transverse members 130 relative to transverse members 132 also limits the net free area (the open area allowing air to pass) reduction presented by inner guard 106.

Transverse members 130 and the remaining intersecting members (outer skirt 128, precipitation baffle 124, inner skirt 126 and transverse members 132) cooperate to form a number of pores (i.e., unobstructed spaces) through inner guard 106 through which airflow can pass. While allowing airflow to pass, inner guard also prevents entry of debris and pests through vent 100. Additional resistance to the entry of debris and pests, as well as precipitation is provided by filter media 104. As further described below, filter media 104 is positioned atop inner guard 106 such that filter media covers each pore in inner guard 106. Filter media 104 is a flexible, porous layer having pores smaller than the pores of inner guard 106. Filter media 104 can be formed from a porous fabric (either woven or unwoven), a fiber mesh or wire screen, for example. If precipitation makes it past inner guard 106, it will encounter filter media 104, on which it will settle and eventual fall from under the force of gravity back through inner guard 106.

Most of the pores of inner guard 106 are formed between one of inner skirt 126 and outer skirt 128, and precipitation baffle 124 and are further defined by the distance separating adjacent transverse members 130, 132. For example, a first pore through inner guard 106 is defined by inner skirt 126, precipitation baffle 124, a transverse member 132 and an adjacent transverse member 130. The next adjacent pore is defined by inner skirt 126, precipitation baffle 124 and two adjacent transverse members 130. Additional pores may be defined between precipitation baffle 124 and outer skirt 128 and further bordered by either a combination of transverse members 130, 132, or an adjacent pair of transverse members 130. As the pores through inner guard 106 approach the corners of inner guard 106, they are bounded by corner transverse members 132.

Figure 7:
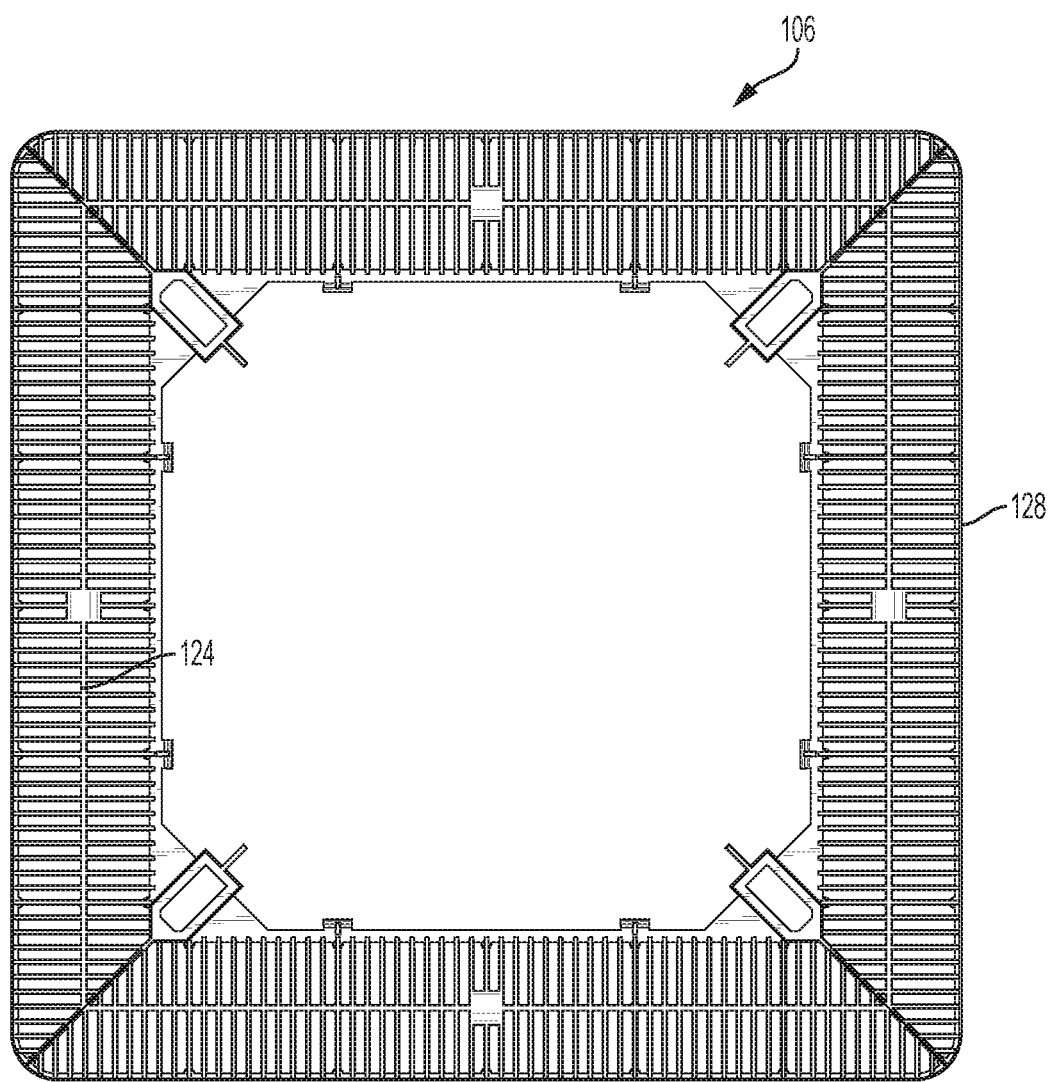
FIG. 7 is a plan view of the inner guard of FIG. 4.
Figure 8:
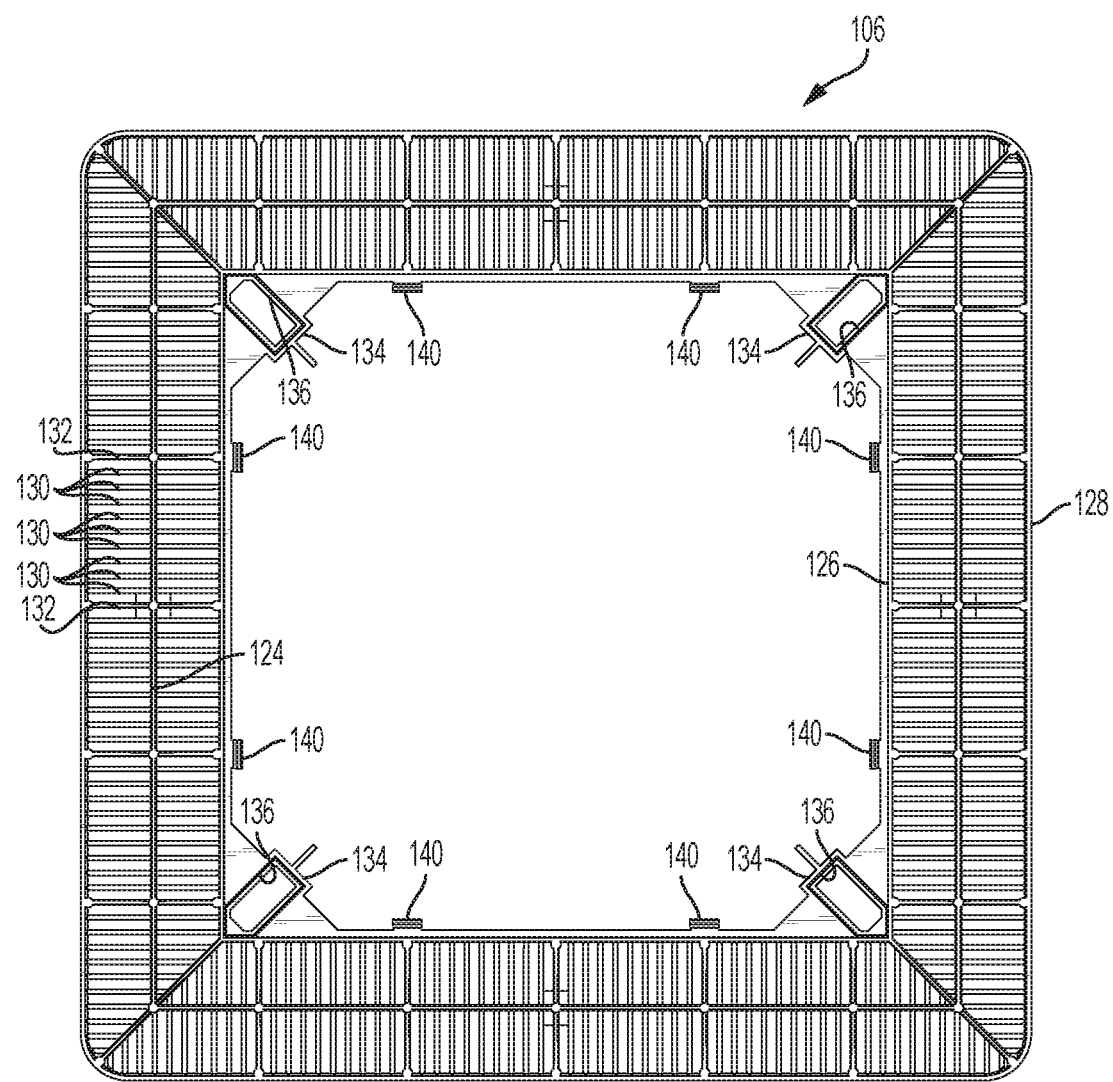
FIG. 8 is a bottom elevational view of the inner guard of FIGS. 4 and 7.

The majority of the pores formed through inner guard 106 are long, narrow pores having dimensions of approximately three millimeters wide by three centimeters long. Note that because transverse members 130 and 132 have a rounded upper surface (with transverse members 130 also having a complimentary rounded lower surface), the three centimeter length is measured along the curved upper surface, i.e., it is the length of the arc defining the top surface. The pores intersecting transverse members 132 positioned at the corners of precipitation baffle 124 (note that corner transverse members 132 are the only transverse members 132 that are not substantially orthogonal to precipitation baffle 124, but rather form complimentary angles of approximately 45 and 135 degrees with precipitation baffle 124) are smaller in size, as illustrated in FIG. 7. On the drawings, only select transverse members 130, 132 are numbered for readability, it being understood that the pattern of transverse members 130, 132 continues about the entirety of inner guard 106 spanning inner skirt 126 and outer skirt 128. In the exemplary embodiment of FIGS. 1-8, filter media 104 is formed of a wire screen having pores measuring about 1.5 millimeters by about 1.5 millimeters. In certain exemplifications, the pore size through filter media 104 is about 2 millimeters squared (2 mm$^2$). In the exemplification of FIGS. 1-8, filter media 104 rests atop inner guard; however, alternative embodiments of the present disclosure contemplate filter media 104 secured to cover 102 and vent wall 114 and completely spanning cover 102 and vent wall 114, without incorporating inner guard 106. Specifically, filter media 104 may extend from vent wall 114 to a cover skirt positioned a laterally outward distance from vent wall 114.

The grate of inner guard 106 defined by inner skirt 126, outer skirt 128, precipitation baffle 124 and transverse members 130, 132 has a pore size defined by a majority of the pores through the inner guard. Similarly, the filter media has a filter media pore size defined by a majority of the pores through the filter media, the filter media pore size smaller than the grate pore size. Generally, the ratio of the pore size of the inner guard to the pore size of the filter media will be at least 2/1. Other embodiments will feature a ratio of the pore size of the inner guard to the pore size of the filter media of about n/1, with n being any whole number from 2 to 60. In certain specific exemplifications, the ratio of the pore size of the inner guard to the pore size of the filter media will be about 54/1 or 11/1. References to pores and/or pore size through the structures of the vents of the present disclosure are to open passages providing functional airflow passages through the vent, not apertures utilized for alternative functions such as securement of one component of the vent to another. As described above, inner guard 106 and filter media 104 function to filter an airflow flowing through vent 100, e.g., preventing unwanted precipitation, debris and pests from passing through vent 100.

Static roof vents are known in the art. However, existing designs suffer disadvantages in their construction. Certain existing static roof vents utilize a screen covering the airflow passageway defined by the vent wall, which creates a significant impediment to achieving the desired net free area in a compact design. Additionally, these designs create a desirable nesting area for birds under the protection of the vent cover. Certain of these designs allow the screen to extend outwardly from the vent wall toward the vent cover, but without fully extending about the entire perimeter of the vent cover and without being anchored to the vent cover. In these constructions, unwanted debris and pests can pass by the gaps between the screen and cover, or push the screen aside to allow nesting under the cover.

The embodiment of the present disclosure illustrated in FIGS. 1-8 addresses the shortcomings of the prior designs described in the preceding paragraph by freeing the airflow passageway through the vent wall from being obstructed by inner guard 106 and filter media 104 (which are further described below). Specifically, inner guard 106 and filter media 104 are arranged so that they extend laterally outwardly from vent wall 114 to span vent wall 114 and cover skirt 122, without positioning porous structure laterally over the airflow passageway defined by vent wall 114 and; therefore, not restricting the net free area through the airflow passageway defined by vent wall 114. Furthermore, inner guard 106 is rigid so that it cannot be deformed or pushed aside by animals that can encounter inner guard 106 when it is assembled to vent 100. Throughout this document a "rigid" inner guard is defined as an inner guard that is sufficiently rigid that it cannot be deformed or pushed aside by animals that can encounter the inner guard when assembled to a vent. Exemplary inner guards of the present disclosure have a flexural modulus of about 110,000 psi. Furthermore, filter media 104 is positioned atop inner guard 106, which blocks animals from being able to push aside filter media 104.

Inner guard 106 is sized so that its outer skirt 128 nominally touches cover skirt 122. Similarly, inner guard 106 is sized so that its inner skirt 126 nominally touches vent wall 114. Even taking tolerances into account, inner guard 106 will substantially span vent wall 114 and cover skirt 122, i.e., there will not be a gap between outer skirt 128 of inner guard 106 and cover skirt 122 that is larger than the gap between adjacent transverse members 130,132 and there will also not be a gap between inner skirt 126 of inner guard 106 and vent wall 114 that is larger than the gap between adjacent transverse members 130,132. In the exemplary embodiment of FIGS. 1-8, the inner perimeter of inner guard 106, i.e. inner skirt 126 will be juxtaposed with vent wall 114 and outer perimeter of inner guard 106, i.e., outer skirt 128 will be juxtaposed with cover skirt 122 to support cover 102 and prevent substantial inward bowing of cover skirt 122, i.e., bowing that will be noticeable to the human eye. In the exemplary embodiment of FIGS. 1-8, cover 102, inner guard 106, and base 108 are all injection molded plastic parts, while filter media 104 is cut from wire screen stock material and formed into the illustrated shape, complimentary with the upper surface of inner guard 106.

FIGS. 9-20 illustrate alternative exemplary vent 200 of the present disclosure. A number of components of vent 200 correspond to components of vent 100 described above. Such components carry similar reference numerals, with the reference numerals for vent 200 being increased by 100 relative to the reference numerals associated with vent 100.

Figure 18:
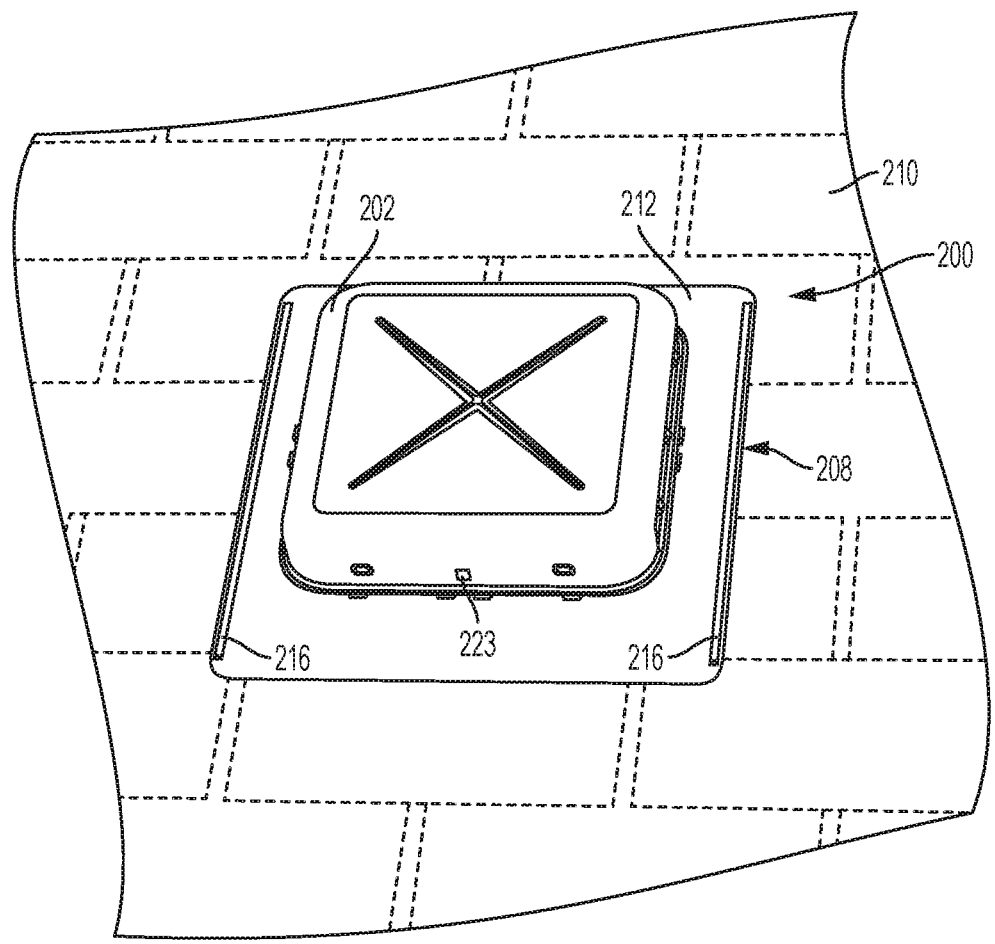
FIG. 18 is a perspective view of the vent of FIG. 9 fully assembled and anchored to a roof.
Figure 19:
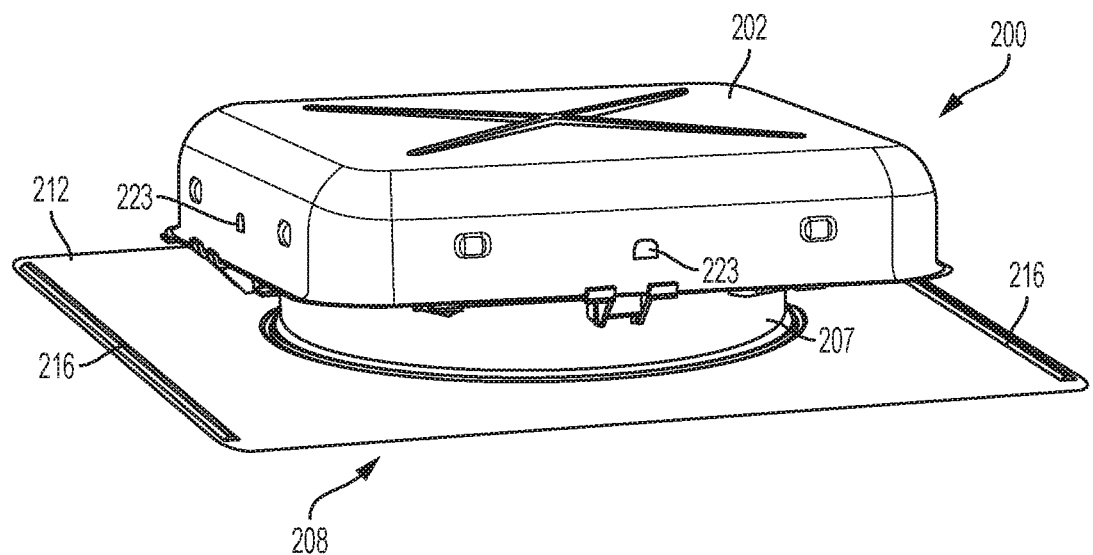
FIG. 19 is another perspective view of the vent of FIG. 9.
Figure 20:
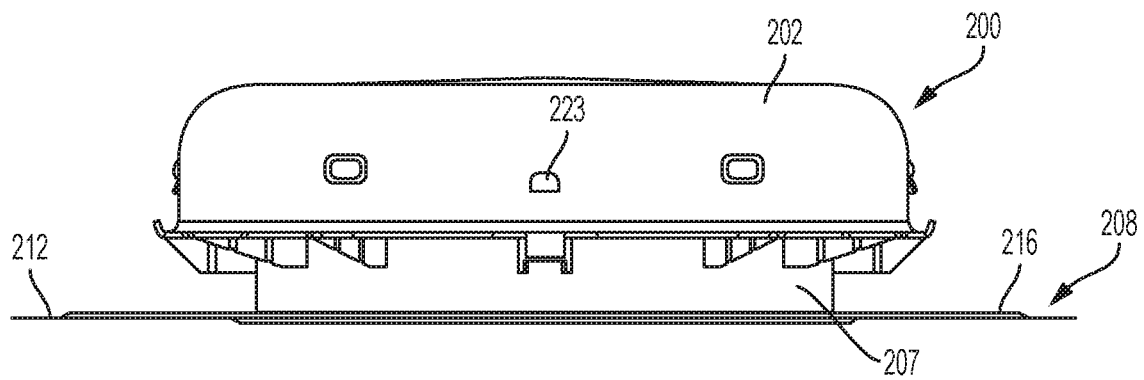
FIG. 20 is a side elevational view of the vent shown in FIG. 19.

Similar to vent 100, vent 200 comprises a static roof vent. Vent 200 is illustrated in FIG. 18 secured to roof 210. Note that FIG. 18 illustrates the shingles of roof 210 in hidden lines and does not show the shingles of roof 210 overlapping flange 212 as will be done in final installation, with the shingles of roof 210 abutting vent wall 214 or skirt 207 of inner guard 206. Vent 200 covers an aperture through roof 210 allowing airflow between the structure beneath roof 210 and the ambient air exterior to the structure covered by roof 210. Vent 200 is further depicted in the illustrations of co-pending design patent application No. 29/545,500, entitled ROOF VENT, previously incorporated by reference in this document.

Referring to FIGS. 9, 12, 13, 15, 17, 19, and 20, vent 200 includes base 208 including flange 212 and vent wall 214. Vent wall 214 is an upstanding wall extending generally orthogonally from flange 212. In use, flange 212 is placed against a partially shingled roof surface and secured thereto with fasteners, such as nails, traversing perimeter apertures (not shown) to secure base 208 to roof 210 (FIG. 18). Specifically, base 208 is secured to roof 210 such that vent wall 214 is positioned atop a correspondingly sized and shaped aperture through roof 210 so that vent wall 214 defines a passageway for fluid communication with the structure underlying roof 210. With base 208 secured to the roof, shingles may be positioned over flange 212 and placed in abutment with an exterior of vent wall 214, or skirt 207 of inner guard 206, as shown in the exemplification illustrated in FIGS. 9-20 of the present disclosure. Note that skirt 207 of inner guard 206 may be, in certain exemplifications, shorter in length such that shingles of roof 210 abut vent wall 214. Rain ridges 216 are provided, as is conventional in the art. Base 208 further includes indexing tabs 209 which will be utilized to index inner guard 206 to base 208 when securing inner guard 206 in operative position, as described further below.

To form finished vent 200, inner guard 206 is positioned atop base 208, with skirt 207 of inner guard 206 positioned about and surrounding vent wall 214 and with indexing tabs 209 positioned in indexing cutouts 211 of inner guard 206 to properly set the rotational position of inner guard 206 with respect to base 208. As there are four indexing tabs 209, complimentary with four indexing cutouts 211, inner guard 206 may be positioned in one of four positions relative to base 208, all of which will provide the proper final alignment of inner guard 206 and base 208, as illustrated, e.g., in FIG. 16. With indexing cutouts 211 aligned with and positioned over indexing tabs 209, inner guard 206 may be pressed downwardly such that flexible fingers 213 (see, e.g., FIG. 16) ride over rim 215 (FIG. 9) extending radially inwardly from vent wall 214. As inner guard 206 is pressed further downwardly, flexible fingers 213 pass rim 215 and thereafter extend to their normally biased position, resting under rim 215. In this position, stop 219 (FIG. 16) rests atop vent wall 214, with rim 215 of vent wall 214 trapped between stop 219 and flexible fingers 213 to secure inner guard 206 to base 208.

Figure 14:
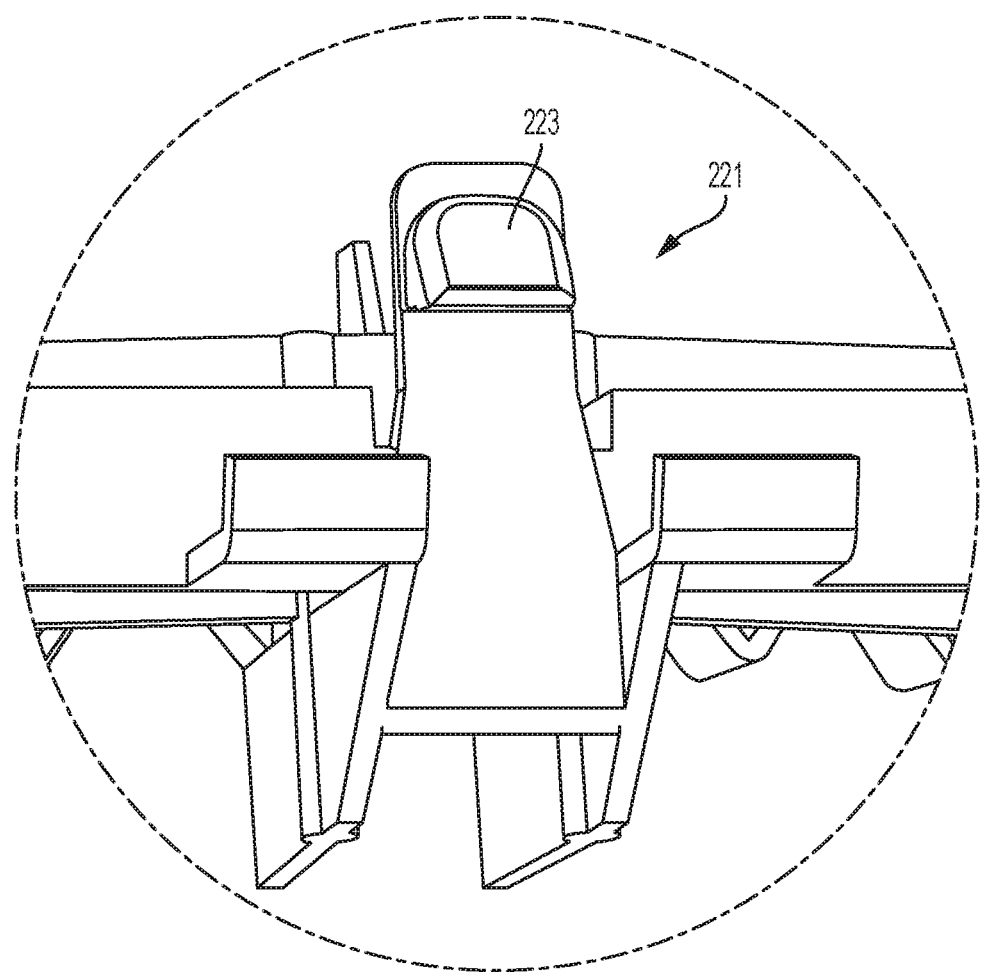
FIG. 14 is a partial, perspective view of a fastener utilized to secure a cover to an inner guard in the roof vent of FIG. 9.
Figure 15:
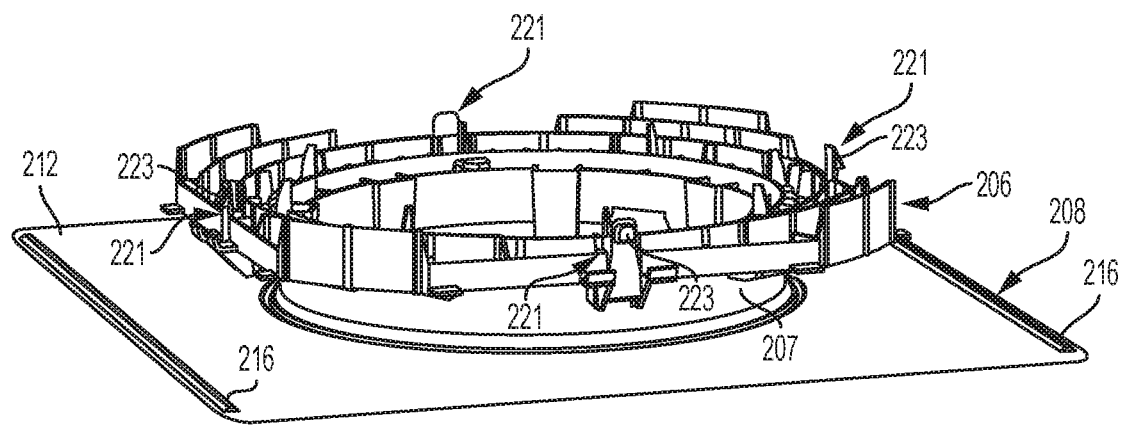
FIG. 15 is a perspective view showing the inner guard and base of the roof vent of FIG. 9 operably secured to each other.

Vent 200 does not feature a layer of filter media covering inner guard 206 such as filter media 104, which forms a part of vent 100, but rather incorporates filter media 204 in the form of a rectangular piece of wire screen formed into a circular shape and placed atop inner guard 206, extending upwardly therefrom. To complete vent 200, cover 202 is positioned atop and secured to inner guard 206, with filter media 204 substantially spanning inner guard 206 and cover 202 such that any spacing between filter media 204 and cover 202 is smaller than the height of the majority of the pores through filter media 204. Specifically, cover skirt 222 is positioned about the perimeter of inner guard 206, with securement apertures 217 aligned with securement tabs 221. As illustrated in FIG. 14, securement tabs 221 include ramped surface 223 on the upward end of the flexible finger forming each securement tab 221. As cover 202 is pressed downwardly, ramped surface 223 contacts the inner surface of cover skirt 222 and securement tabs 221 are flexed inwardly. As ramped surfaces 223 of the four securement tabs 221 positioned about the perimeter of inner guard 206 enter securement apertures 217, securement tabs 221 return to their normally biased positions with ramped surfaces 223 occupying securement apertures 217 to secure cover 202 to inner guard 206. In this position, the lower surface of cover skirt 222 abuts support tabs 225 positioned about the outer perimeter of inner guard 206.

Figure 12:
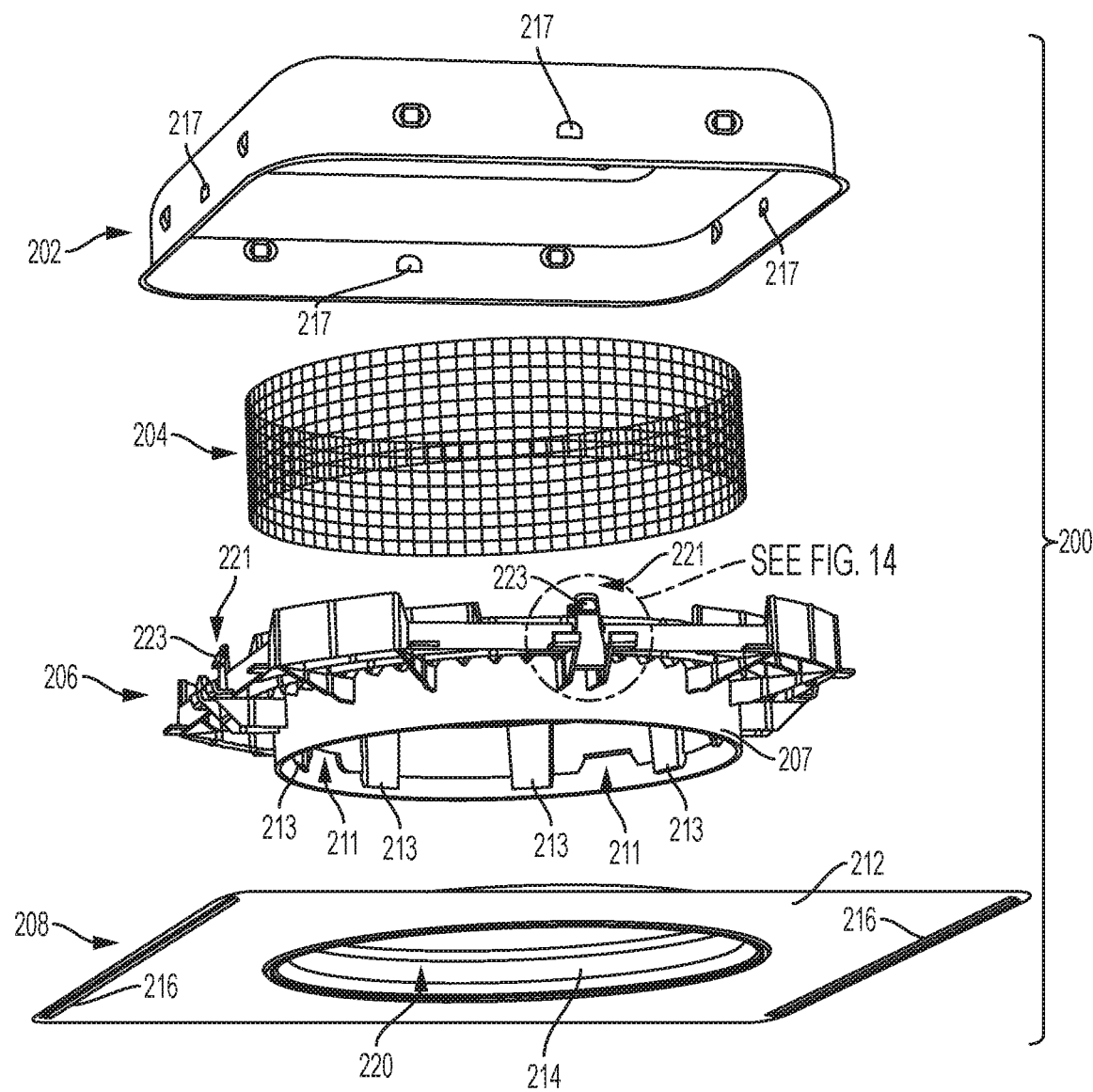
FIG. 12 is another exploded perspective view from the bottom of the vent of FIG. 9.
Figure 13:
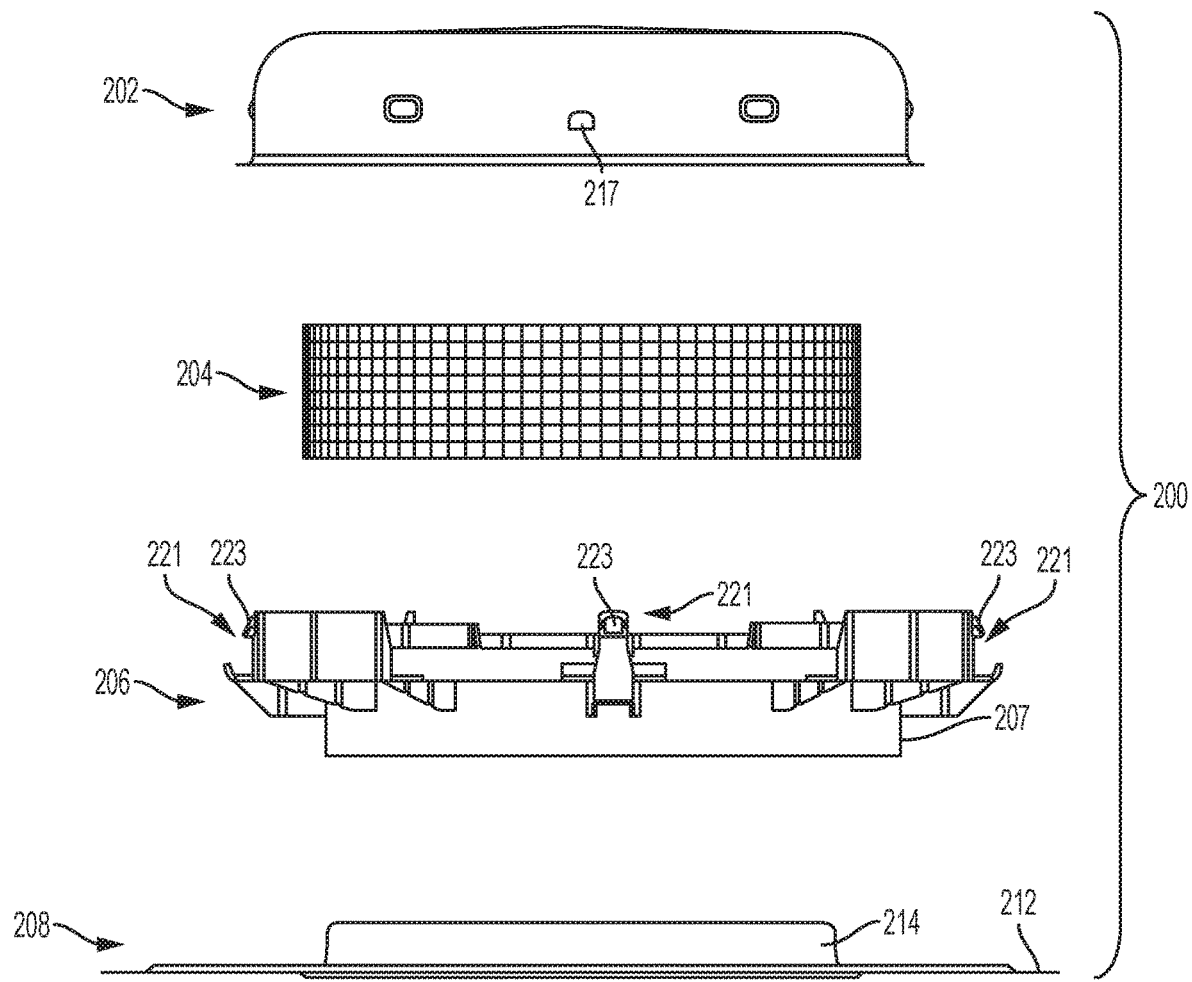
FIG. 13 is a side elevational, exploded view of the vent of FIG. 9.

Referring to FIG. 12, when assembled for use, vent 200 features mouth 220 defined by the intersection of vent wall 214 and flange 212. In use, mouth 220 will be positioned atop and adjacent to a similarly sized and shaped aperture formed through roof 210 (FIG. 18) of the building to be vented. In this position, hot air from the underlying structure can rise out of the building and through vent 200 to the atmosphere outside. Initially, hot air can rise through mouth 220 of vent 200. At this point, such hot air can flow upwardly through the central aperture of inner guard 206 to, the undersurface of cover 202, through filter media 204 and thereafter downwardly through the grate defined by inner guard 206, which is further described below. This flow path tracks flow path F depicted in FIG. 3 with respect to vent 100. While flow can pass from interior to exterior and exterior to interior through vent 200, depending on the conditions, vent 200 is exemplified as a static roof vent, which will typically be utilized to provide an airflow path out of the underlying building to the exterior.

Figure 9:
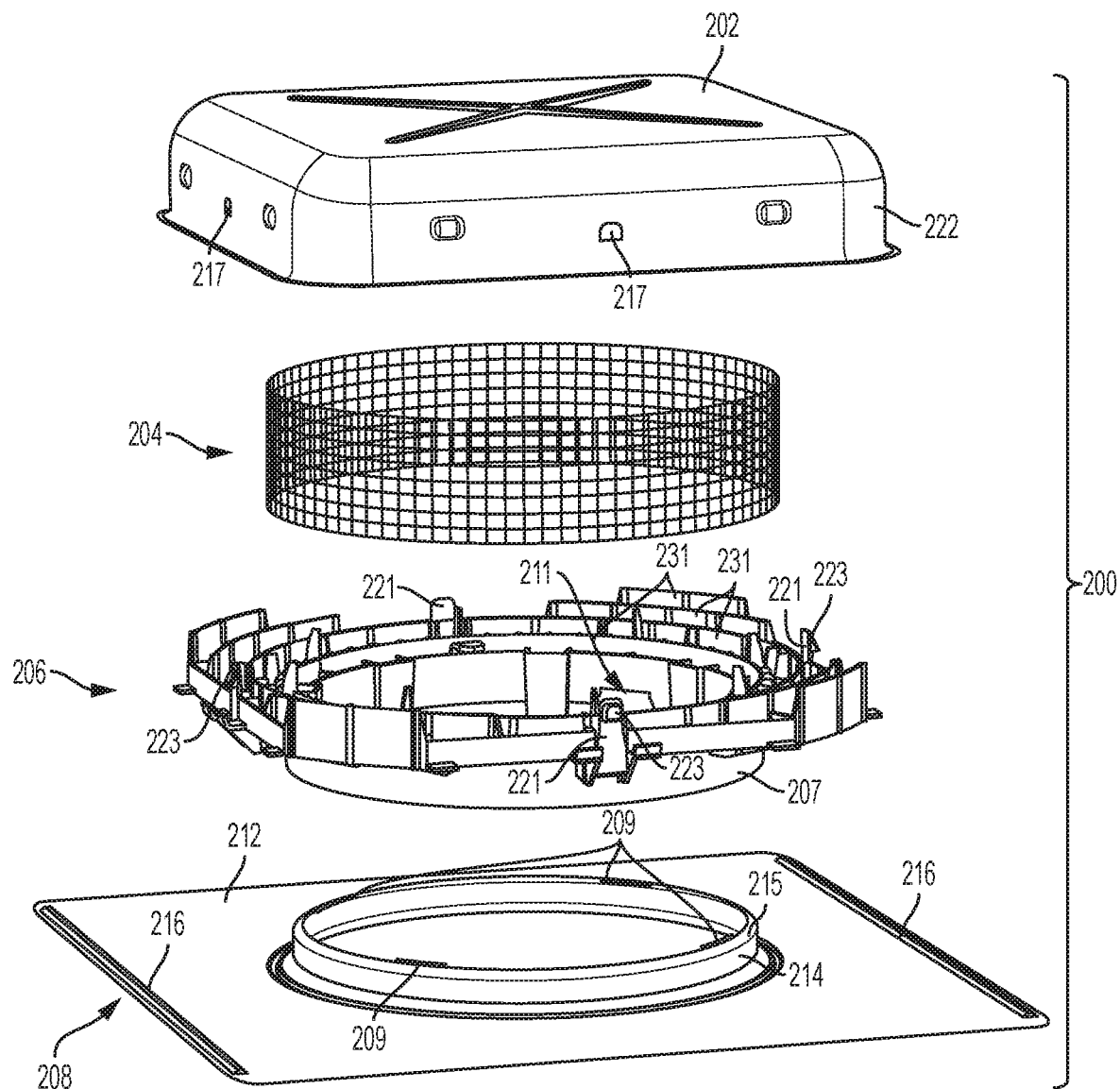
FIG. 9 is a perspective, exploded view of a second embodiment vent of the present disclosure.
Figure 10:
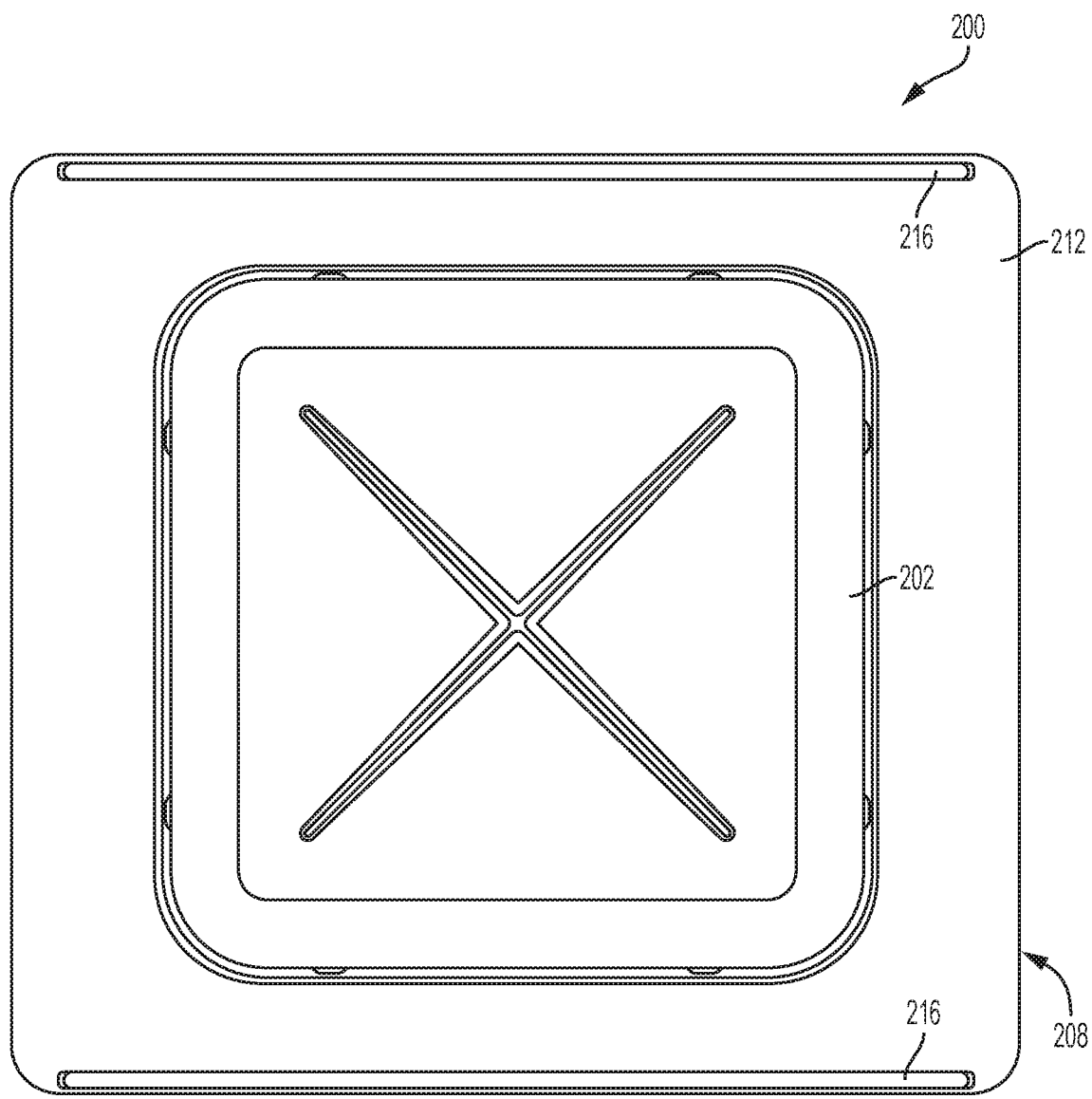
FIG. 10 is a top plan view of the vent of FIG. 9.
Figure 11:
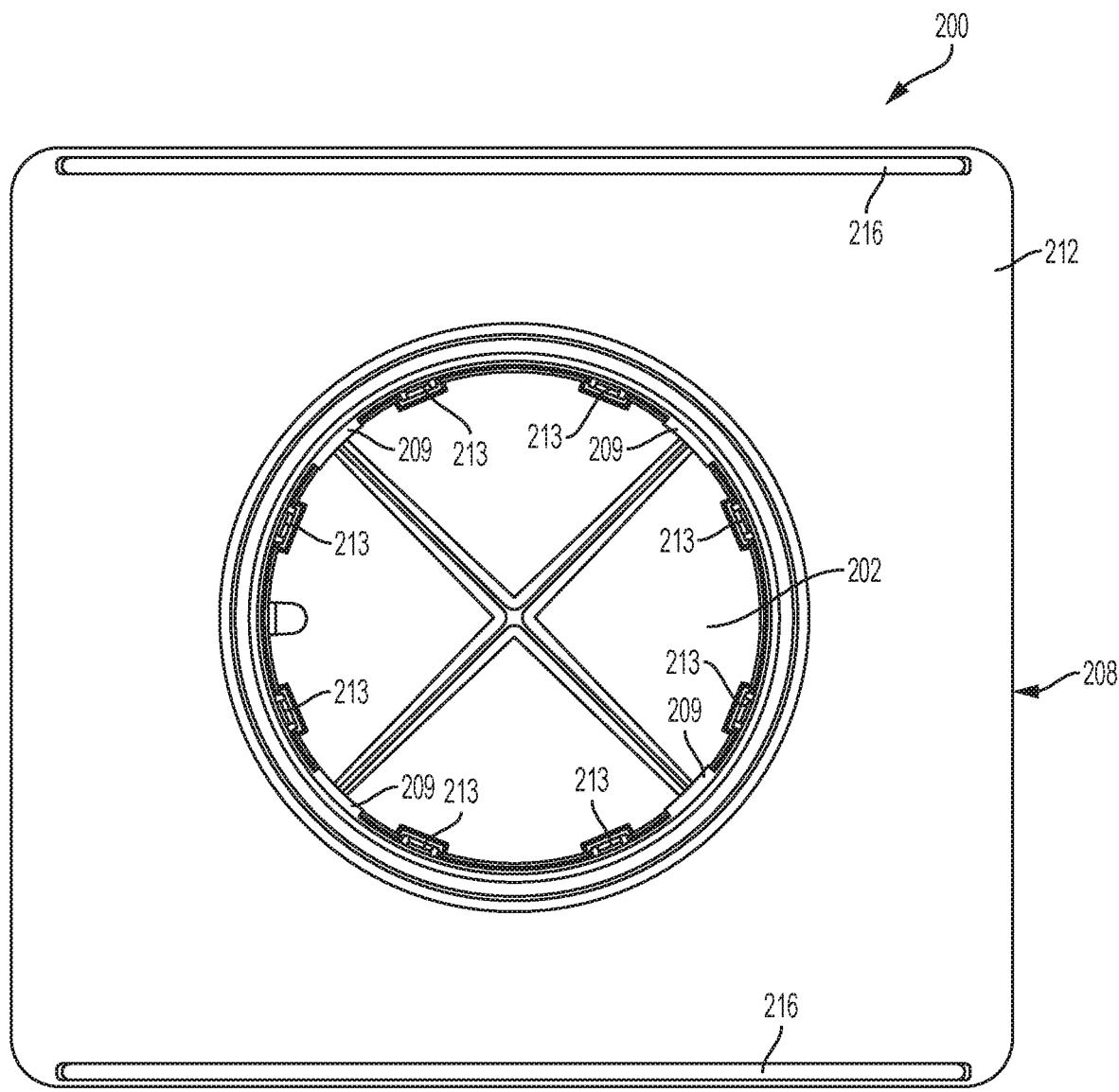
FIG. 11 is a bottom elevational view of the vent of FIG. 9.
Figure 16:
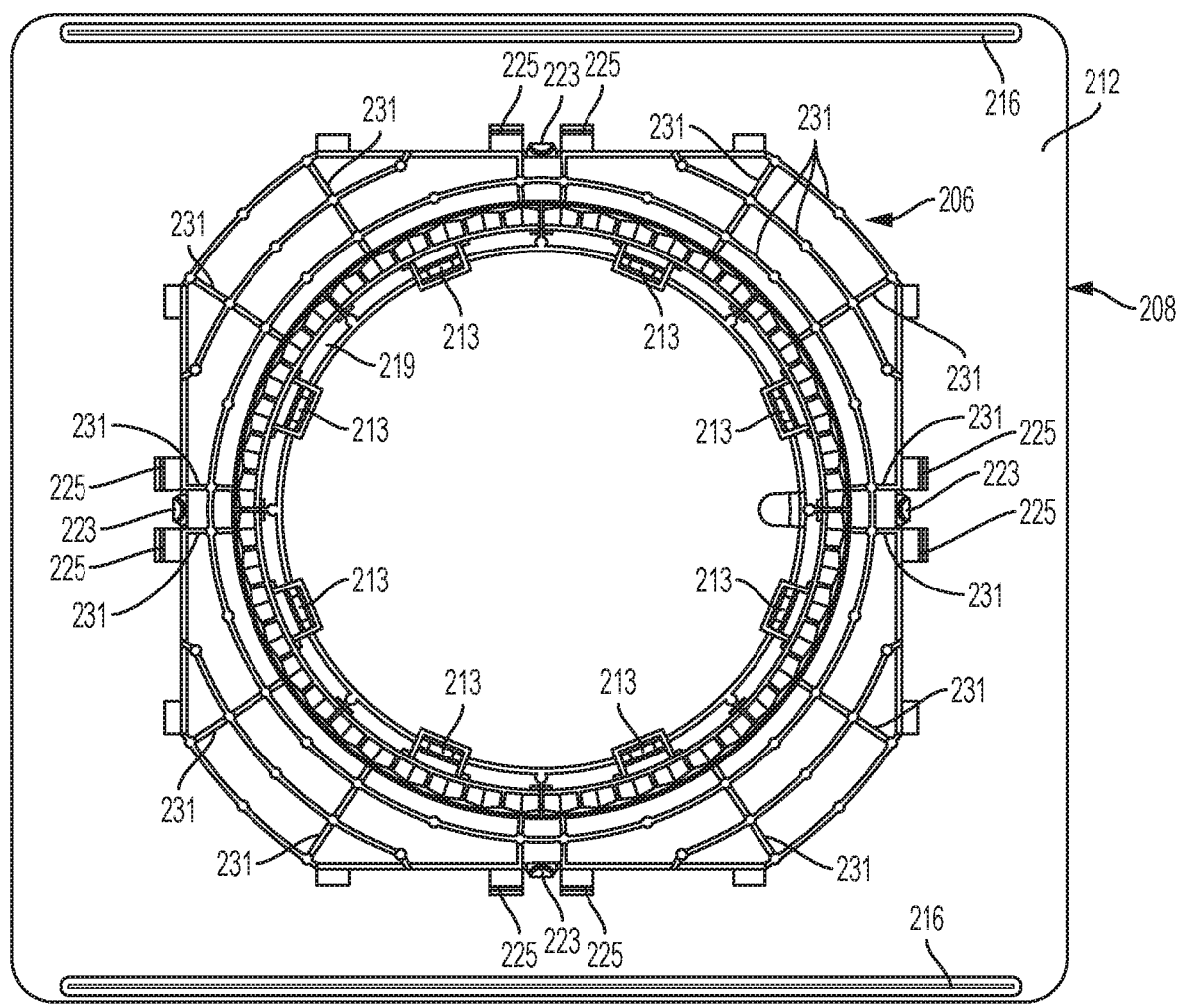
FIG. 16 is a top plan view of the construct shown in FIG. 15.
Figure 17:
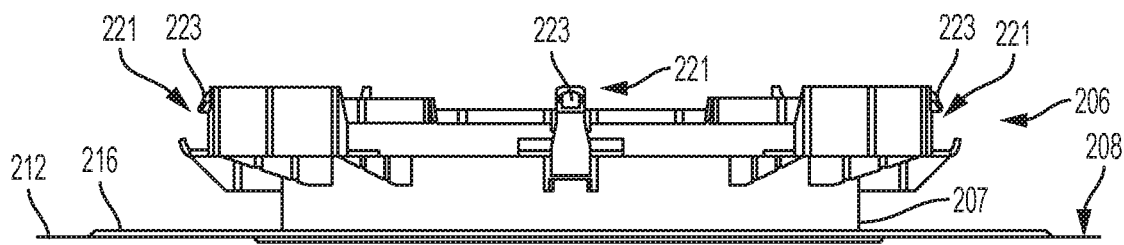
FIG. 17 is a side elevational view of the construct shown in FIGS. 15 and 16.

While advantageously allowing airflow between the underlying building and the atmosphere exterior of the building, vent 200 also prevents intrusion of unwanted debris and living creatures, such as birds and animals, as well as precipitation. Referring to FIGS. 9 and 16, inner guard 206 includes a plurality of intersecting members defining a grate, specifically, referring to FIG. 16, intersecting members 231 define pores therebetween, allowing airflow through inner guard 206, while preventing ingress of pests and debris. Intersecting members 231 can act as precipitation baffles, as described above with respect to vent 100. Intersecting members 231 have free top and bottom ends, such that they define floating precipitation baffles as previously described. While the exemplification of vent 200 depicted in FIGS. 9-20 does not feature a layer of filter media positioned atop inner guard 206, such filter media may be added in an alternative exemplification, in a manner similar to that described above with respect to vent 100.

Inner guard 206 extends laterally outward from vent wall 214 to span vent wall 214 and cover skirt 222, without positioning pore structure laterally over the airflow passageway defined by vent wall 214 and; therefore, not restricting the net free area through the airflow passageway defined by vent wall 214. Inner guard 206 is rigid so that it cannot be deformed or pushed aside by animals that can encounter inner guard 206 when it is assembled to vent 200. As defined above, a "rigid" inner guard is defined by an inner guard that is sufficiently rigid that it cannot be deformed or pushed aside by animals that can encounter the inner guard when assembled to a vent. Filter media 204 also does not restrict the net-free area through the airflow passageway defined by vent wall 214. As with the exemplification of vent 100, vent 200 features a pore size through inner guard 206 that is larger than the pore size through filter media 204. Specifically, a majority of pores through inner guard 206 are larger than a majority of pores through filter media 204, with the ratio of inner guard pore size to filter media pore size being, in alternative exemplifications thereof, the same as the ratios described above with respect to vent 100.

The present invention has been described in terms of specific embodiments, examples, implementations and configurations which are intended to be exemplary or illustrative only. Other variants, modifications, refinements and applications of this innovative technology will become readily apparent to those of ordinary skill in the art who have had the benefit of reading this disclosure. Such variants, modifications, refinements and applications fall within the ambit and scope of the present invention. Accordingly, the scope of the exclusive right sought by the Applicant for the present invention is intended to be limited solely by the appended claims and their legal equivalents.

What is claimed is:

1. A vent, comprising:
a base comprising a vent wall defining a passageway for fluid communication with a structure to be vented;
a cover positioned over the passageway to cover a lateral extent of the passageway, the cover including a cover skirt;
an inner guard, the inner guard defining a grate, the inner guard including a connector for selectively connecting the inner guard to the base, the grate extending laterally outwardly from the vent wall when the inner guard is connected to the base, the inner guard sized to substantially span the vent wall and the cover skirt; and
wherein the inner guard comprising a precipitation baffle, the precipitation baffle positioned between the vent wall and the cover skirt, the precipitation baffle having a height defined between a top and a bottom of the precipitation baffle, the top and the bottom of the precipitation baffle spaced from the base and the cover to define a floating precipitation baffle.

2. The vent of claim 1, wherein the base further comprises a flange, the flange extending outwardly from the vent wall for securing the vent to a building, the inner guard spaced upwardly from the flange to create an open space for an airflow between the flange and the inner guard.

3. The vent of claim 1, wherein the inner guard comprises a rigid inner guard having an outer perimeter juxtaposed with the cover skirt to support the cover and prevent substantial inward bowing of the cover skirt.

4. The vent of claim 1, wherein the grate comprises a plurality of intersecting members defining a plurality of openings, and wherein the precipitation baffle comprises a tallest one of the intersecting members.

5. The vent of claim 1, wherein the grate of the inner guard is defined by a plurality of intersecting members intersecting the precipitation baffle, a first plurality of the intersecting members having a first height, a second plurality of the intersecting members having a second height, the first height less than the second height, the second plurality of the intersecting members spaced along the precipitation baffle, a plurality of the first plurality of the intersecting members positioned between adjacent ones of the second plurality of the intersecting members.

6. The vent of claim 1, wherein the cover is selectively securable to the base, with the inner guard captured between the cover and the base.

7. The vent of claim 6, further comprising:
a layer of filter media overlying the inner guard, the layer of filter media captured between the cover and the inner guard, the cover including a plurality of filter media extensions extending from an undersurface of the cover to abut the layer of filter media positioned over the inner guard.

8. The vent of claim 1, further comprising:
a layer of filter media overlying the inner guard, the grate having a grate pore size defined by a majority of a plurality of pores through the inner guard, the filter media having a filter media pore size defined by a majority of a plurality of pores through the filter media, the filter media pore size smaller than the grate pore size, whereby moisture encountering the filter media will not pass the filter media and will drip, via gravity, away from the passageway.

9. The vent of claim 8, wherein the layer of filter media comprises a mesh screen.

10. The vent of claim 8, wherein a ratio of the grate pore size to the filter media pore size is at least 2 to 1, whereby each pore through the grate is at least twice as big as each pore through the filter media.

11. The vent of claim 1, wherein the grate does not overlay the passageway, whereby the grate of the inner guard filters an airflow flowing through the vent without laterally covering the passageway defined by the vent wall.

12. The vent of claim 1, wherein the inner guard includes a connector for selectively connecting the inner guard to the vent wall to substantially span the vent wall and the cover skirt.

13. The vent of claim 1, wherein the inner guard comprises a rigid inner guard having an outer perimeter juxtaposed with the cover skirt to support the cover and prevent substantial inward bowing of the cover skirt.

14. The vent of claim 1, wherein the grate of the inner guard comprises a plurality of intersecting members defining a plurality of openings, and wherein the precipitation baffle comprises a tallest one of the intersecting members.

15. The vent of claim 1, wherein the grate is defined by a plurality of intersecting members intersecting the precipitation baffle, a first plurality of the intersecting members having a first height, a second plurality of the intersecting members having a second height, the first height less than the second height, the second plurality of the intersecting members spaced along the precipitation baffle, a plurality of the first plurality of the intersecting members positioned between adjacent ones of the second plurality of the intersecting members.

16. A vent, comprising:
a base comprising a vent wall defining a passageway for fluid communication with a structure to be vented;
a cover positioned over the passageway to cover a lateral extent of the passageway;
an inner guard, the inner guard defining a grate having a grate pore size, the inner guard positioned to filter an airflow flowing through the vent;
a layer of filter media overlying the inner guard, the filter media having a filter media pore size, the filter media pore size smaller than the grate pore size;
wherein the cover includes a cover skirt, and wherein the inner guard substantially spans the vent wall and the cover skirt, with the grate extending laterally outwardly from the vent wall; and
wherein the inner guard comprises a precipitation baffle, the precipitation baffle positioned between the vent wall and the cover skirt, the precipitation baffle having a height defined between a top and a bottom of the precipitation baffle, the top and the bottom of the precipitation baffle spaced from the base and the cover to define a floating precipitation baffle.

17. The vent of claim 16, wherein the cover is selectively securable to the vent wall to laterally cover the passageway.

18. The vent of claim 16, wherein the base further comprises a flange, the flange extending outwardly from the vent wall for securing the vent to a building, the inner guard spaced upwardly from the flange to create an open space for the airflow between the flange and the inner guard.

19. The vent of claim 16, wherein the cover is selectively securable to the base, with the inner guard and the layer of filter media captured between the cover and the base, the cover including a plurality of filter media extensions extending from an undersurface of the cover to abut the layer of filter media positioned over the inner guard.

20. The vent of claim 16, wherein the filter media comprises a mesh screen.

21. The vent of claim 16, wherein a ratio of the grate pore size to the filter media pore size is at least 2 to 1, whereby each pore through the grate is at least twice as big as each pore through the filter media.

22. The vent of claim 16, wherein the grate does not overlay the passageway.

23. The vent of claim 16, wherein the layer of filter media overlies the inner guard such that the filter is shaped complementary to a shape of the inner guard.

24. A vent, comprising:
a vent wall defining a passageway for fluid communication with a structure to be vented;
a cover positioned over the passageway to cover a lateral extent of the passageway, the cover including a cover skirt, the cover skirt positioned a laterally outward distance from the vent wall;
  a layer of filter media having a pore size of about 2 millimeters squared spanning the vent wall and the cover skirt;
  wherein the vent further comprises a flange extending outwardly from the vent wall for securing the vent to a building, and an inner guard defining a grate, the inner guard, spaced upwardly from the flange to create an open space for an airflow between the flange inner guard;
  wherein the inner guard comprises a precipitation baffle, the precipitation baffle positioned between the vent wall and the cover skirt, the precipitation baffle having a height defined between a top and a bottom of the precipitation baffle, the top and the bottom of the precipitation baffle spaced from the flange and the cover to define a floating precipitation baffle.

25. The vent of claim 24, wherein the grate of the inner guard comprises a plurality of intersecting members defining a plurality of openings, and wherein the precipitation baffle comprises a tallest one of the intersecting members.

26. The vent of claim 24, wherein the grate of the inner guard is defined by a plurality of intersecting members intersecting the precipitation baffle, a first plurality of the intersecting members having a first height, a second plurality of the intersecting members having a second height, the first height less than the second height, the second plurality of the intersecting members spaced along the precipitation baffle, a plurality of the first plurality of the intersecting members positioned between adjacent ones of the second plurality of the intersecting members.

27. The vent of claim 24, wherein:
the inner guard spans the vent wall and the cover skirt, the layer of filter media overlying the grate.

28. The vent of claim 27, wherein the inner guard comprises a rigid inner guard having an outer perimeter juxtaposed with the cover skirt to support the cover and prevent substantial inward bowing of the cover skirt.

29. The vent of claim 27, wherein the cover is selectively securable to the vent wall, with the inner guard captured between the cover and the base, and the layer of filter media captured between the cover and the inner guard, the cover including a plurality of filter media extensions extending from an undersurface of the cover to abut the layer of filter media positioned over the inner guard.

30. The vent of claim 27, wherein the grate of the inner guard has a grate pore size defined by a majority of a plurality of pores through the inner guard, the filter media having a filter media pore size defined by a majority of a plurality of pores through the filter media, the filter media pore size smaller than the grate pore size, whereby moisture encountering the filter media will not pass the filter media and will drip, via gravity away from the passageway.

31. The vent of claim 30, wherein the filter media comprises a mesh screen.

32. The vent of claim 30, wherein a ratio of the grate pore size to the filter media pore size is at least 2 to 1, whereby each pore through the grate is at least twice as big as each pore through the filter media.

33. The vent of claim 27, wherein the grate does not overlay the passageway.

* * * * *